(12) United States Patent
Nishiyama et al.

(10) Patent No.: US 9,685,822 B2
(45) Date of Patent: Jun. 20, 2017

(54) MANAGEMENT APPARATUS AND MANAGEMENT METHOD FOR ELECTRICAL APPLIANCES

(75) Inventors: Hiromichi Nishiyama, Osaka (JP); Keiji Sakaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 836 days.

(21) Appl. No.: 13/395,452

(22) PCT Filed: Jun. 27, 2011

(86) PCT No.: PCT/JP2011/003656
§ 371 (c)(1),
(2), (4) Date: Mar. 12, 2012

(87) PCT Pub. No.: WO2012/008104
PCT Pub. Date: Jan. 19, 2012

(65) Prior Publication Data
US 2012/0173177 A1    Jul. 5, 2012

(30) Foreign Application Priority Data
Jul. 13, 2010    (JP) ................................ 2010-159173

(51) Int. Cl.
*H02J 13/00* (2006.01)
*H02J 3/14* (2006.01)

(52) U.S. Cl.
CPC ..... *H02J 13/0017* (2013.01); *H02J 2003/143* (2013.01); *Y02B 70/3216* (2013.01);
(Continued)

(58) Field of Classification Search
CPC ............ H02J 13/0017; H02J 2003/143; Y02B 70/3216; Y02B 90/2607; Y04S 20/224; Y04S 20/221; Y04S 20/242; Y04S 40/12
(Continued)

(56) References Cited

U.S. PATENT DOCUMENTS 5,832,068 A * 11/1998 Smith ....................... 379/114.14
8,090,480 B2 * 1/2012 Brumfield et al. ........... 700/296
(Continued)

FOREIGN PATENT DOCUMENTS

| JP | 2003-259569 | 9/2003 |
|---|---|---|
| JP | 2003-348771 | 12/2003 |

(Continued)

OTHER PUBLICATIONS

International Search Report issued Aug. 23, 2011 in International (PCT) Application No. PCT/JP2011/003656.

*Primary Examiner* — Michael Nghiem
*Assistant Examiner* — Peter Ngo
(74) *Attorney, Agent, or Firm* — Wenderoth, Lind & Ponack, L.L.P.

(57) ABSTRACT

A measurement unit measures power supplied from an outlet, a first acquisition unit acquires outlet identification information and power supply information which indicates a value of power supplied within a predetermined period of time, the value being measured by the measurement unit. Additionally, a second acquisition unit acquires appliance identification information and power consumption information which indicates a value of power consumed by the appliance within the predetermined period, a comparison unit compares the power supply information with the power consumption information, and a generation unit generates information indicating an association between the appliance and the outlet using the outlet identification information and (Continued)

the appliance identification information when a concordance rate between the power supply information and the power consumption information exceeds a threshold value according to the comparison result by the comparison unit.

12 Claims, 16 Drawing Sheets

(52) U.S. Cl.
CPC ....... *Y02B 70/3266* (2013.01); *Y02B 90/2607* (2013.01); *Y04S 20/221* (2013.01); *Y04S 20/224* (2013.01); *Y04S 20/242* (2013.01); *Y04S 40/12* (2013.01)

(58) Field of Classification Search
USPC .............................................. 702/62, 57, 60
See application file for complete search history.

(56) References Cited

U.S. PATENT DOCUMENTS

| | | | |
|---|---|---|---|
| 2001/0025349 A1* | 9/2001 | Sharood | G06Q 30/0235 713/340 |
| 2003/0085624 A1 | 5/2003 | Kadoi et al. | |
| 2010/0007219 A1 | 1/2010 | De Buda et al. | |
| 2010/0030393 A1* | 2/2010 | Masters et al. | 700/295 |
| 2010/0070214 A1* | 3/2010 | Hyde et al. | 702/61 |
| 2011/0112780 A1* | 5/2011 | Moss | 702/62 |

FOREIGN PATENT DOCUMENTS

| | | |
|---|---|---|
| JP | 2004-134920 | 4/2004 |
| JP | 2004-316443 | 11/2004 |
| JP | 2009-281855 | 12/2009 |
| JP | 2010-213411 | 9/2010 |

* cited by examiner

FIG. 5

| Distribution board electrical current | Location information | Electrical outlet identification number |
|---|---|---|
| A1 | Living room (west side) | 1 |
| A2 | Living room (east side) | 2 |
| | | 3 |
| B | Kitchen | 4 |
| | | 5 |
| C | Office | 6 |
| | | 7 |
| | | 8 |
| D | Bedroom | 9 |
| | | 10 |
| ... | ... | ... |

FIG. 11A

| Association information | |
|---|---|
| Home appliance identifier | Electrical outlet identification number |
| A101 | 1 |
| W021 | 4 |
| L311 | 9 |
| ... | ... |

FIG. 11B

| Association information | |
|---|---|
| Home appliance name | Electrical outlet location |
| Air conditioner PX-2 | Living room (west side) |
| Washing machine NR8 | Kitchen |
| Light LT35 | Bedroom |
| ... | ... |

FIG. 12

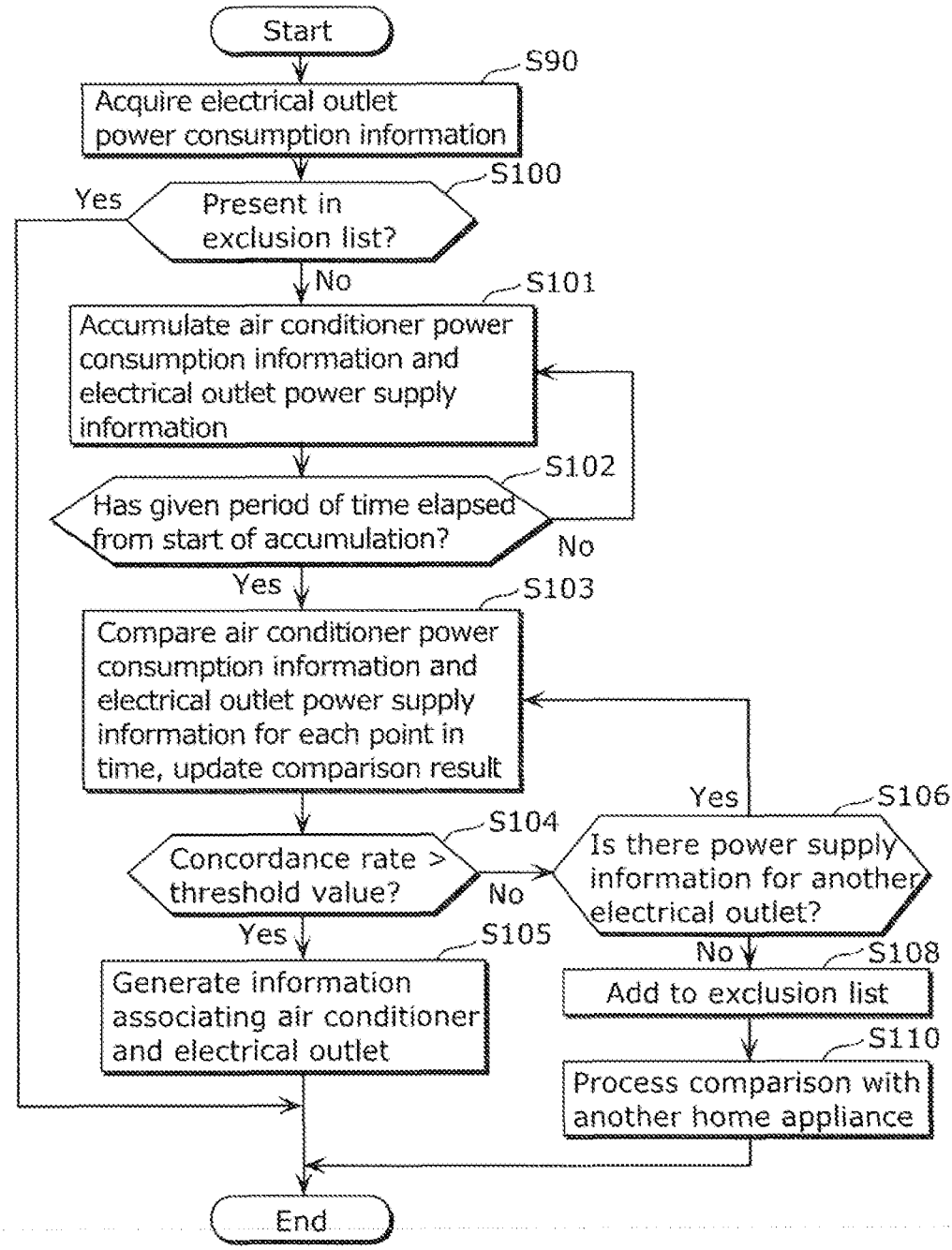

MANAGEMENT APPARATUS AND MANAGEMENT METHOD FOR ELECTRICAL APPLIANCES

TECHNICAL FIELD

The present invention relates to a management method for electrical appliances over a network formed of a management apparatus and a plurality of electrical appliances connected to the management apparatus.

BACKGROUND OF INVENTION

Background Art

In recent years, connecting home appliances to each other over a network has been considered as a way to help make less of an impact on the environment. For example, unnecessary power consumption can be reduced by informing the user how much power is being consumed by each home appliance by making this information viewable. Additionally, as another example, home appliances can be shut off remotely by the management apparatus when the user decides the home appliance does not need to be on.

When implementing such a service in which home appliances are connected over a network, it is necessary to set up the management apparatus which manages the network with location information such as the name of the room in which a home appliance is installed so that the user can comprehend where the home appliances are installed.

One example of a conventional home appliance management method is preloading characteristic current waveforms of home appliances in a server apparatus so that the apparatus can determine what type of home appliance is installed when the home appliance is plugged into an electrical outlet and turned on according to the current waveform (for example see PTL 1).

FIG. 17 shows a conventional home appliance management method disclosed in PTL 1. Here, the current waveform information for a home appliance 9 and a home appliance 10 when the power is turned on is preloaded in a home server 7. An electrical outlet is and an electrical outlet 1b equipped with an electric current detector are capable of receiving a current waveform transmitted by a home appliance when it is operating. When the home appliance 9 or the home appliance 10 is used by a user, the current waveform retrieved at the electrical outlet is or electrical outlet 1b equipped with an electric current detector is compared with the current waveform information preloaded in the server apparatus. As a result, the type of home appliance being used can be detected.

[CITATION LIST]

[Patent Literature]

[PTL 1] Japanese Unexamined Patent Application Publication No. 2003-259569.

SUMMARY OF INVENTION

However, according to the conventional configuration exemplified above, the home appliance current waveform information must be preloaded in the server apparatus. Therefore, if a home appliance that has a current waveform which is not included in the preloaded current waveform information is plugged into an electrical outlet, a problem arises in which the type of home appliance and the electrical outlet into which the home appliance is plugged cannot be determined even if the configuration exemplified above is used.

Additionally, according to the conventional configuration exemplified above, it is possible that a current waveform received from an electrical outlet will cause the home appliance to be unable to be identified correctly if there are two different home appliances with a similar current waveform.

Accordingly, the object of the present invention is to solve the problems associated with the conventional configuration described above by providing a management apparatus and management method for electrical appliances which will identify the installation location of an electrical appliance without requiring a user to perform a complicated operation.

In order to solve these problems, the management apparatus according to an aspect of the present invention includes a communication unit configured to communicate with an electrical appliance connected over a network, a measurement unit configured to measure a value of power supplied from an electrical outlet to the electrical appliance, a first acquisition unit configured to acquire identification information for the electrical outlet and power supply information which indicates a value of power , supplied within a predetermined period, the value being measured by the measurement unit, a second acquisition unit configured to acquire from the electrical appliance, via the communication unit, identification information for the electrical appliance and power consumption information which indicates a value of power consumed by the electrical appliance within the predetermined period, a comparison unit configured to compare the power supply information acquired by the first acquisition unit with the power consumption information acquired by the second acquisition unit, and a generation unit configured to generate information indicating an association between the electrical appliance and the electrical outlet using the identification information for the electrical outlet and the identification information for the electrical appliance when a concordance rate between the power supply information and the power consumption information exceeds a threshold value according to a result of the comparison by the comparison unit.

With this configuration, when a user plugs an electrical appliance such as a home appliance into an electrical outlet, the electrical power measured at the electrical outlet and the electrical power measured at the home appliance is compared. If the result of this comparison yields a concordance rate that exceeds a threshold value, the management apparatus determines that that electrical outlet is supplying power to that home appliance. In other words, the management apparatus associates that home appliance with that electrical outlet.

Therefore, according to this aspect of the management apparatus, which electrical appliance is plugged into which electrical outlet can be determined by using a measured value of power supplied from the electrical outlet and a measured value of power consumed by the electrical appliance. As a result, the management apparatus can identify where the electrical appliance is installed.

According to this aspect, the installation location of an electrical appliance can be identified simply by the user plugging the electrical appliance into an electrical outlet without requiring the user to perform a complicated operation.

BRIEF DESCRIPTION OF DRAWINGS

FIG. 5 is a table showing the location-electrical outlet information according to the first embodiment of the present invention.

FIG. 11A is a table showing an example of association information generated by the generation unit according to the first embodiment of the present invention.

FIG. 11B is a table showing another example of association information generated by the generation unit according to the first embodiment of the present invention.

FIG. 12 shows an example of a user interface for displaying power consumption information for home appliances and for remote operation of home appliances according to the first embodiment of the present invention.

FIG. 15 is a flowchart showing an example of processes involving home appliance authentication performed by the management apparatus according to the second embodiment of the present invention.

FIG. 16 is a graph showing an example of exclusion list data stored in the management apparatus according to the second embodiment of the present invention.

DETAILED DESCRIPTION OF INVENTION

Figure 1:
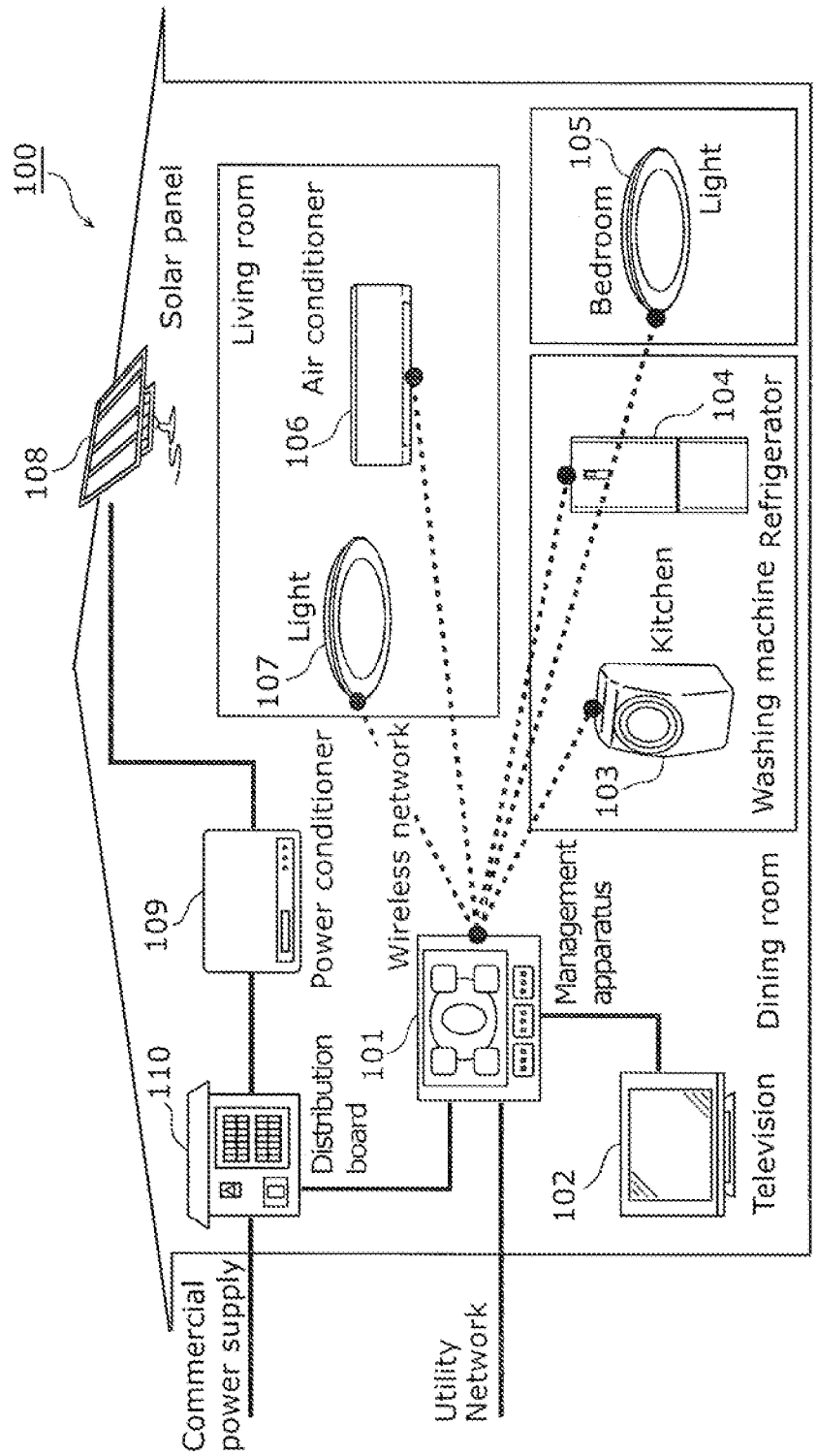
FIG. 1 is a schematic diagram of a home appliance network system according to the first embodiment of the present invention.

The management apparatus according to an aspect of the present invention includes a communication unit configured to communicate with an electrical appliance connected over a network, a measurement unit configured to measure a value of power supplied from an electrical outlet to the electrical appliance, a first acquisition unit configured to acquire identification information for the electrical outlet and power supply information which indicates a value of power supplied within a predetermined period, the value being measured by the measurement unit, a second acquisition unit configured to acquire from the electrical appliance identification information for the home appliance and power consumption information which indicates a value of power consumed by the electrical appliance within the predetermined period, a comparison unit configured to compare the power supply information acquired by the first acquisition unit with the power consumption information acquired by the second acquisition unit, and a generation unit configured to generate information indicating an association between the electrical appliance and the electrical outlet using the identification information for the electrical outlet and the identification information for the electrical appliance when a concordance rate between the power supply information and the power consumption information exceeds a threshold value according to a result of the comparison by the comparison unit.

With this configuration, the electrical power measured at the electrical outlet and the electrical power measured at the electrical appliance are compared, for example, when a user plugs an electrical appliance into an electrical outlet. If the result of this comparison yields a concordance rate that exceeds a threshold value, the management apparatus determines that that electrical outlet is supplying power to that electrical appliance. In other words, the to management apparatus associates that electrical appliance with that electrical outlet.

Therefore, according to this aspect of the management apparatus, which electrical appliance is plugged into which electrical outlet can be determined easily and with great accuracy by using a measured value of power supplied from the electrical outlet and a measured value of power consumed by the electrical appliance without requiring the user to perform a complicated operation.

Moreover, in the management apparatus according to an aspect of the present invention, the comparison unit may be configured to compare the value of power supplied at at least one point in time within the predetermined period with the value of power consumed at the at least one point in time within the predetermined period, the value of power supplied being obtained from the power supply information, and the value of power consumed being obtained from the power consumption information, and the generation unit may be configured to determine that the concordance rate between the power supply information and the power consumption information exceeds the threshold value when a difference between the value of power supplied and the value of power consumed is within a predetermined range according to the result of the comparison by the comparison unit.

With this configuration, the association of a home appliance and an electrical outlet is determined by comparing a value of power supplied and a value of power consumed at at least one point in time (actual value or estimate value of electrical power at that point in time). Therefore, for example, it is possible to further increase efficiency in determining the installation location of an electrical appliance.

Moreover, in the management apparatus according to an aspect of the present invention, the comparison unit may be configured to compare values of power supplied at points in time within the predetermined period, included in which is the one point time, with values of power consumed at the respective points in time within the predetermined period, included in which is the one point in time, the values of power supplied being obtained from the power supply information, and the values of power consumed being obtained from the power consumption information, and the generation unit may be configured to calculate the concordance rate between the power supply information and the power consumption information using differences between the values of power supplied and the values of power consumed at the respective points in time obtained from the results of the comparison by the comparison unit.

With this configuration, the concordance rate between the power supply information and the power consumption information is calculated using a value of power supplied and a value of power consumed at each of a plurality of points in time (actual value or estimate value of electrical power at each of a plurality of points in time). Therefore, for example, it is possible to further increase accuracy in determining the installation location of an electrical appliance.

Moreover, in the management apparatus according an aspect of the present invention, the first acquisition unit may be configured to acquire the power supply information indicating the value of power supplied at respective points in time within the predetermined period, the second acquisition unit may be configured to acquire the power consumption information indicating the value of power consumed the respective points in time within the predetermined period, the comparison unit may be configured to compare a first variation pattern with a second variation pattern, the first variation pattern being obtained from the power supply information and indicating a change in the power supplied within the predetermined period, and the second variation pattern being obtained from the power consumption information and indicating a change in the power consumed within the predetermined period, and the generation unit may be configured to determine that the concordance rate between the power supply information and the power consumption information exceeds the threshold value when the difference between a first variation pattern and the second variation pattern is within a predetermined range according to the result of the comparison by the comparison unit.

With this configuration, the association of a electrical appliance and an electrical outlet is determined by comparing the variation pattern of power supplied and the variation pattern of power consumed. Therefore, for example, it is possible to further increase the degree of certainty in determining the installation location of an electrical appliance.

Moreover, in the management apparatus according an aspect of the present invention, the measurement unit may be configured to measure a value of power supplied from each of the electrical outlets, including the electrical outlet, the first acquisition unit may be configured to acquire pieces of identification information for each of the electrical outlets and pieces of power supply information which indicates a value of power supplied within a predetermined period for each of the electrical outlets, the comparison unit may be configured to compare each piece of the power supply information acquired by the first acquisition unit with the power consumption information acquired by the second acquisition unit, and the generation unit may be configured to generate information indicating an association between the electrical appliance and the electrical outlet which corresponds to the piece of the power supply information indicating that the concordance rate with the power consumption information exceeds the threshold value according to the result of the comparison by the comparison unit.

With this configuration, the power consumption information for a single electrical appliance is compared with the power supply information for each of a plurality of electrical outlets. Therefore, for example, the electrical outlet which supplies power to the electrical appliance will be accurately identified. In other words, the installation location of an electrical appliance can be accurately identified.

Moreover, in the management apparatus according to the present invention, the generation unit may be configured to identify a piece of the power supply information with a highest concordance rate and generate information indicating an association between the electrical outlet corresponding to the identified power supply information and the home appliance among two or more pieces of the power supply information indicating a value exceeding the threshold value of the concordance rate between the power supply information and the power consumption information.

With this configuration, among the plurality of possible electrical outlets to which a certain single electrical appliance may be connected, the electrical outlet which supplies power to the electrical appliance will be identified with absolute certainty.

Moreover, the management apparatus according to an aspect of the present invention may further include a notification unit configured to send out a notification of the completion of electrical appliance association when the generation unit generates the association information.

With this configuration, for example, the process of measuring and sending the amount of power consumed by the electrical appliance can be stopped by sending out a notification of the completion of electrical appliance association to the electrical appliance.

As a result, unnecessary processes by an electrical appliance as well as unnecessary processes such as the receiving and discarding of nonessential power consumption information by the management apparatus are prevented.

Moreover, the management apparatus according to an aspect of the present invention further includes a storage unit configured to store an exclusion list, wherein (a) the comparison unit is configured to add the identification information for the home appliance to the exclusion list when the concordance rate between the power supply information and the power consumption information is equal to or smaller than the threshold value, and (b) when the second acquisition unit further acquires power consumption information and identification information for the electrical appliance from the electrical appliance or a different electrical appliance, (b-i) the comparison unit is configured to skip comparing the power supply information with the power consumption information when the identification information for the electrical appliance is stored in the exclusion list, while (b-ii) the comparison unit is configured to compare the power supply information with the power consumption information when the identification information for the electrical appliance is not stored in the exclusion list.

With this configuration, even if the second acquisition unit acquires information transferred over a wireless network, for example, such as power consumption information from an outside electrical appliance not within the management realm of the management apparatus, the power supply information and the power consumption information for the outside electrical appliance will not be compared. In other words, the installation location of a home appliance can be identified more efficiently as unnecessary processing is prevented.

Furthermore, the present invention can be realized as a management method according to any of the preceding aspects, the management method including characteristic processes performed by the management apparatus.

Furthermore, the present invention can be realized as a computer program for causing a computer to perform processes included in the management method or as a recording medium having the computer program thereon. The program can then be distributed via a transmission medium such as the internet or a recording medium such as a DVD.

Furthermore, the present invention can be realized as an integrated circuit according to any of the preceding aspects, the integrated circuit having a characteristic component included in the management apparatus.

The embodiments of the present invention will be explained below with reference to the attached drawings. While home appliances are used as an example of an electrical appliance in each of the embodiments explained below, electrical appliances according to the present invention are not limited to home appliances; other electrical appliances such as a battery or an electric automobile are also applicable examples according to the present invention.

[First Embodiment]

FIG. 1 is a schematic diagram of a home appliance network system 100 according to the first embodiment of the present invention.

A management apparatus 101 is a terminal implemented to provide environmentally friendly services. The management apparatus 101 performs the main functions of the home appliance network system 100.

The management apparatus 101 is connected to a television 102. A user can view information output from the management apparatus 101 on the television 102. Also, a user can use the remote control of the television 102 to operate a user interface screen displayed on the television 102 by the management apparatus 101.

The display function such as the one television 102 makes use of is an internal function of the main body of the management apparatus 101, and a user may operate the user interface screen directly on the management apparatus 101.

Also, the management apparatus 101 has wireless communication capability. The management apparatus 101 is capable of communicating wirelessly with a home appliance such as an air conditioner 106 or a light 107 in a living room, a washing machine 103 or a refrigerator 104 in a kitchen, or a light 105 in a bedroom.

The types, number, and installation locations of the home appliances included in the home appliance network system 100 in FIG. 1 are shown for the purpose of illustration. The types, number, and installation locations of the home appliances included in the home appliance network system 100 are not limited to those specified in the illustrated example.

Each home appliance has either a built-in wireless module or an external device which provides wireless communication capability. Each home appliance can send appliance information wirelessly to the management apparatus 101 such as a home appliance name or part number, as well as state information such as operating state information. While it is not shown in FIG. 1, each home appliance is connected to a distribution board 110 via an electrical outlet.

The appliance information and state information that is collected wirelessly is managed by the management apparatus 101. The management apparatus 101 can display the status of a home appliance on the user interface screen. The management apparatus 101 can also receive operating information from a home appliance depending on the nature of the operation of the home appliance by a user.

The management apparatus 101 can also send information wirelessly to each home appliance. When a user inputs operation settings of home appliances using the user interface screen, the wireless module of the management apparatus 101 sends the operation information to each wireless module of the corresponding home appliances. This makes operation of home appliances possible.

Also, the management apparatus 101 is connected to the distribution board 110 for the home and measures the power flowing to the distribution board 110. The management apparatus 101 can measure electrical power per electrical outlet via the distribution board 110.

Also, a solar panel 108 and a power conditioner 109 are installed in the home and are connected to the management apparatus 101 via the distribution board 110.

The management apparatus 101 controls the distribution of power throughout the home by interpreting the power consumption obtained from the distribution board 110, and the amount of energy generated by the solar panel 108. Also, the management apparatus 101 adjusts the amount of energy generated by the solar panel 108 by controlling the power conditioner 109.

It is possible for the management apparatus 101 to be connected to outside the home with a service provider or a power company via a utility network and the management apparatus 101 can control the load according to the power demand.

Figure 2:
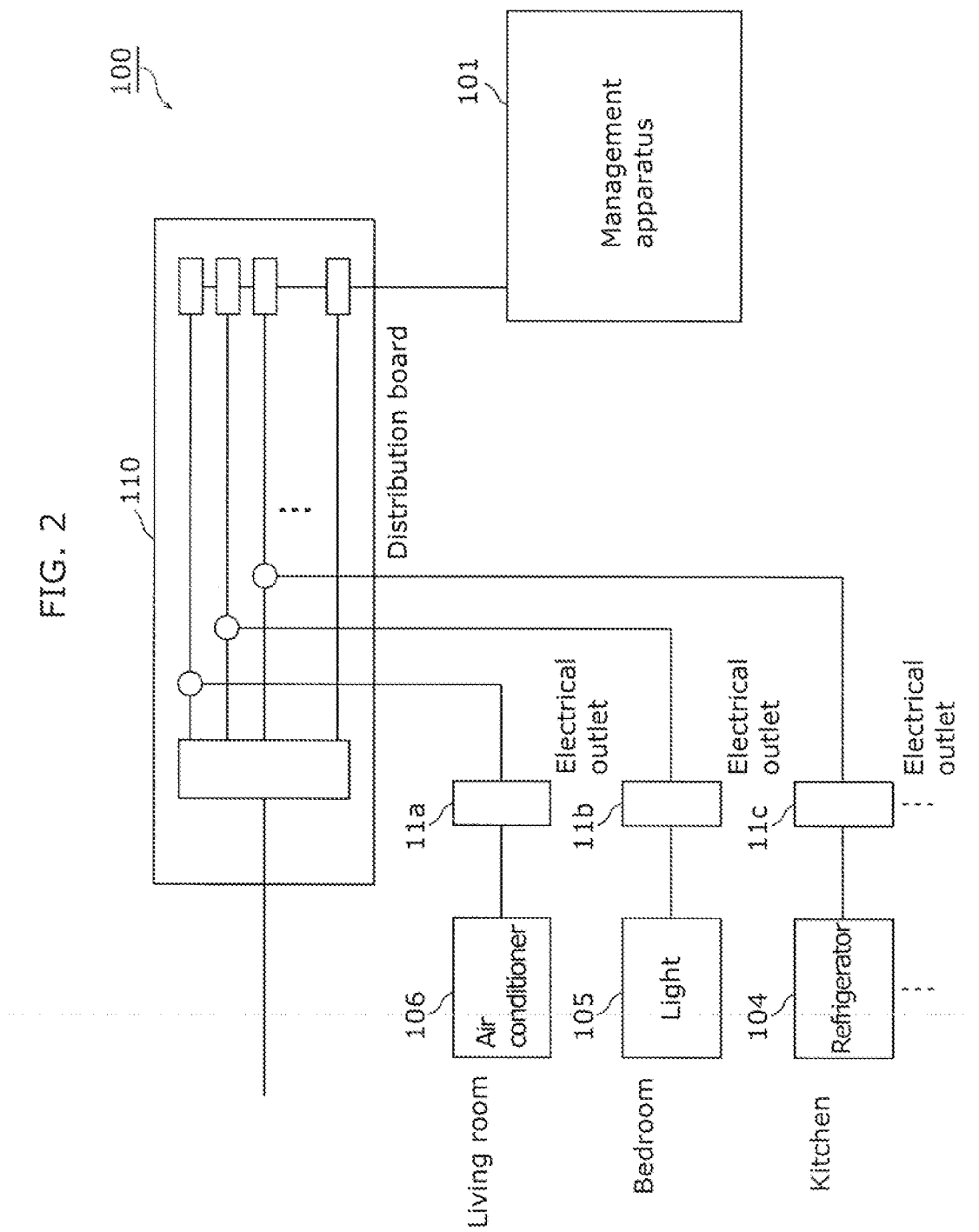
FIG. 2 is a diagram showing the connection relation among a distribution board, a management apparatus, and home appliances according to the first embodiment of the present invention.

FIG. 2 is a diagram showing the connection relation among a distribution board, a management apparatus, and home appliances according to the first embodiment of the present invention.

Power is supplied to the air conditioner 106 in the living room, the light 105 in the bedroom, and the refrigerator 104 in the kitchen from an electrical outlet 11*a*, an electrical outlet 11*b*, and an electrical outlet 11*c*, respectively. The electrical outlet 11*a*, the electrical outlet 11*b*, and the electrical outlet 11*c* are connected to the distribution board 110.

The distribution board 110 is provided with a function for measuring the electrical current consumption in each circuit. The distribution board 110 sends the measured electrical current information to the management apparatus 101 over a network. A variety of types of networks can be used, and the network can be a wired or wireless network, or a combination of both.

The management apparatus 101 can measure the amount of power consumed by a home appliance per electrical outlet using the electrical current information retrieved from the distribution board 110. The management apparatus 101 can save information which indicates the amount of power measured.

Figure 3:
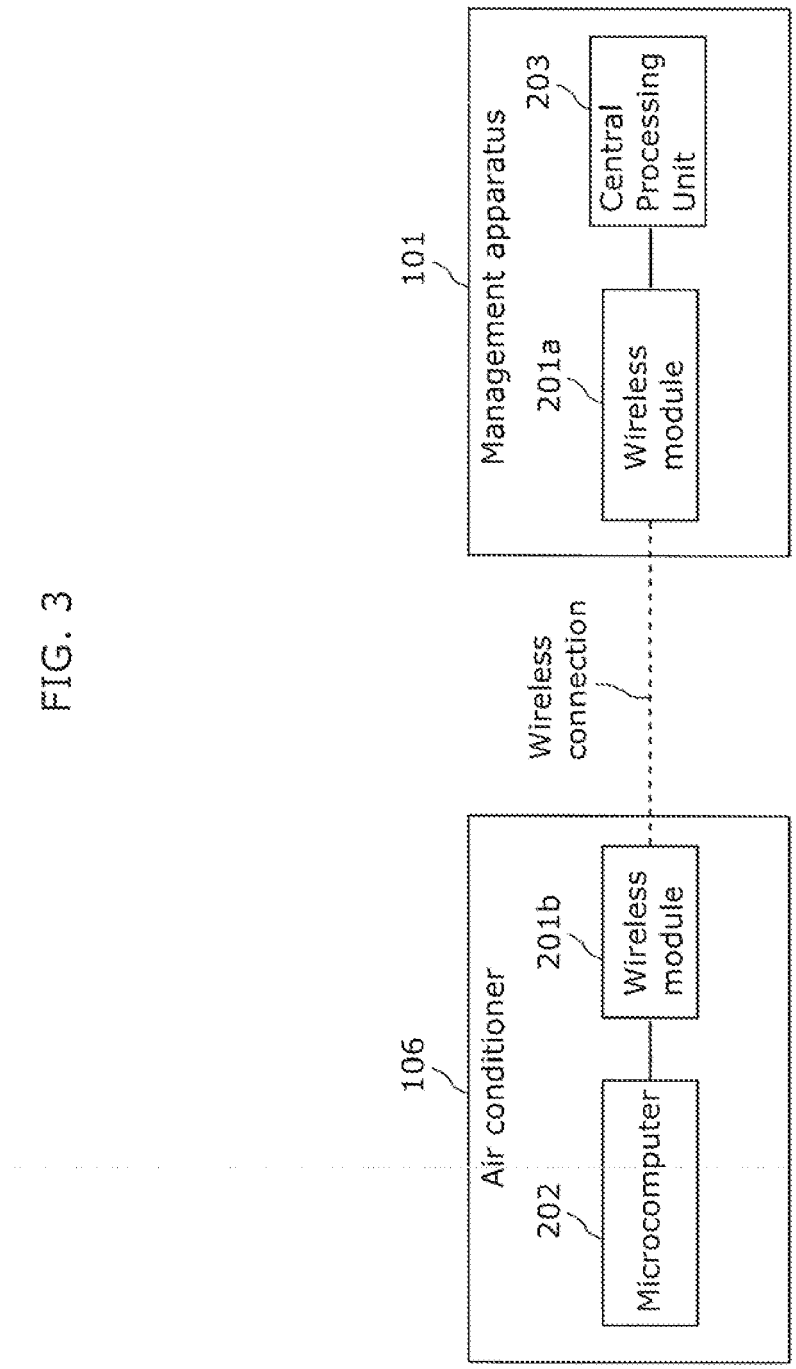
FIG. 3 is a diagram showing a basic hardware configuration for wireless communication between a home appliance and the management apparatus according to the first embodiment of the present invention.

FIG. 3 is a diagram showing a basic hardware configuration for wireless communication between a home appliance and the management apparatus according to the first embodiment of the present invention.

A wireless module 201*b* and a microcomputer 202 are built into the air conditioner 106.

The wireless module 201*b* is controlled by the microcomputer 202. The wireless module 201*b* can transmit and receive data to and from the management apparatus 101 via wireless communication. The wireless module 201*b* may also be provided externally on the air conditioner 106 instead of being built-in as a communications adapter.

An Inter-Integrated Circuit (I2C) or a Serial Peripheral Interface (SPI) is used for the connection when the wireless module 201*b* is built into the air conditioner 106.

A Recommended Standard 232 (RS-232) or a Universal Serial Bus (USB) is used for the connection when the wireless module 201*b* is connected externally to the air conditioner 106.

A wireless module 201*a* and a central processing unit 203 are built into the management apparatus 101. The wireless module 201*a* communicates wirelessly with the wireless module 201*b* under the control of the central processing unit 203.

Microcomputers and wireless modules are also installed in home appliances other than the air conditioner 106 as well, such as the washing machine 103, and information can be exchanged between a home appliance and the management apparatus 101 via wireless communication.

The wireless module 201*a* installed in the management apparatus 101 and the wireless module 201*b* installed in home appliances such as the air conditioner 106 use low cost, low power-consuming wireless technologies that can be built into home appliances such as specified lower power radio, ZigBee or Bluetooth, for example. In other words, the wireless modules 201*a* and 201*b* can save power through intermittent operation, by switching between sleep and wake-up using carrier sensing.

This system can realize a communications network between the home appliances and the management apparatus 101 by using this kind of wireless module, which is more low-cost than fitting a power line communication (PLC) modem to the home appliances or installing a built-in Ethernet (registered trademark) modem into the home appliances.

Needless to say, even if each home appliance is connected to the management apparatus 101 over a wired network, the management apparatus 101 can identify the installation location of each home appliance efficiently and accurately.

Figure 4:
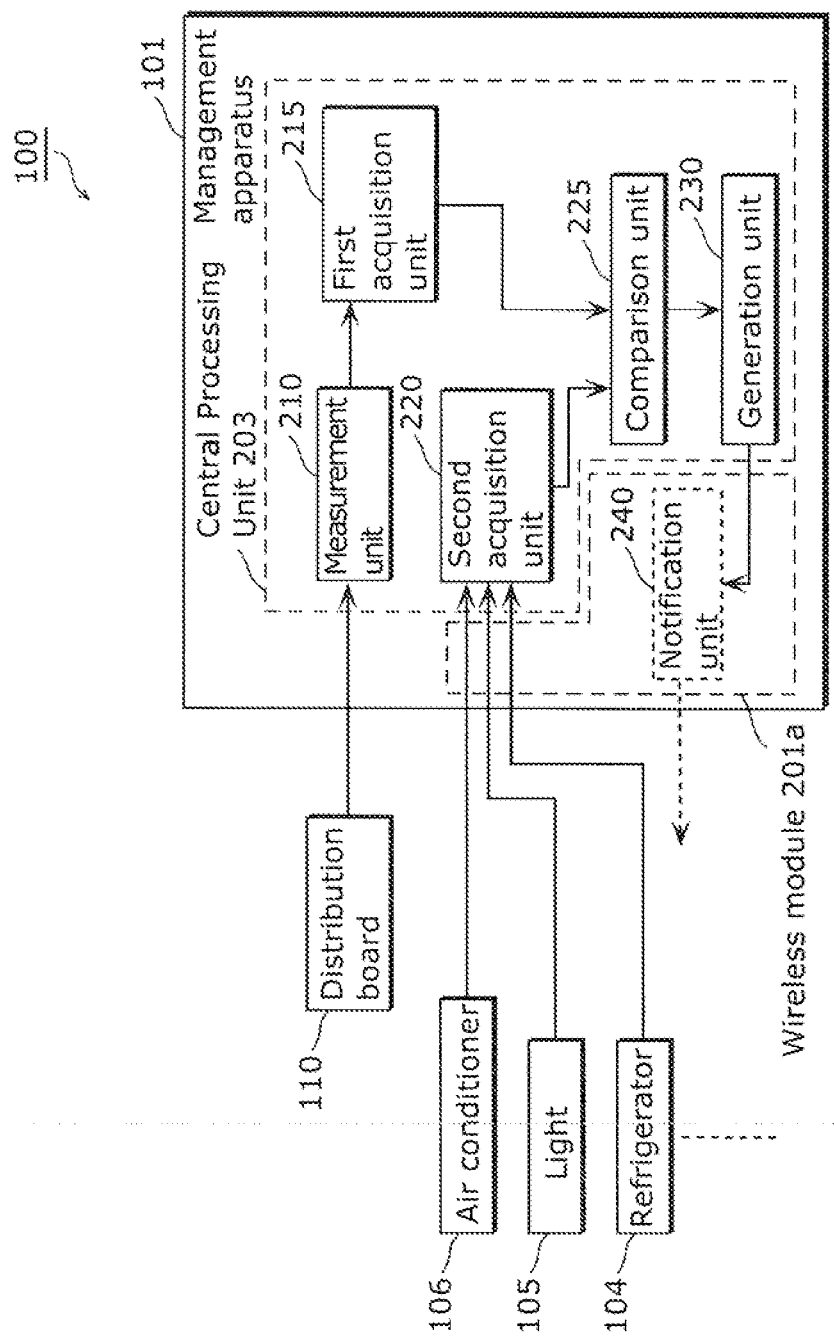
FIG. 4 is a block diagram showing a basic functional configuration of the management apparatus according to the first embodiment of the present invention.

FIG. 4 is a block diagram showing a basic functional configuration of the management apparatus 101 according to the first embodiment of the present invention.

As shown in FIG. 4, the management apparatus 101 includes a measurement unit 210, a first acquisition unit 215, a second acquisition unit 220, a comparison unit 225, a generation unit 230, and a notification unit 240. The measurement unit 210, the first acquisition unit 215, the second acquisition unit 220, the comparison unit 225, and the generation unit 230 are included in the central processing unit 203 in FIG. 3. The notification unit 240 is included in the wireless module 201*a* in FIG. 3.

The measurement unit 210 measures an amount of power supplied from an electrical outlet to a home appliance. In other words, the measurement unit 210 measures an amount of power consumed by home appliances from each electrical outlet.

The first acquisition unit 215 acquires identification information and power supply information for the electrical outlet. The power supply information indicates a value of power supplied within a predetermined period, the value having been measured by the measurement unit 210.

The second acquisition unit 220 acquires from a home appliance the identification information and the power consumption information for the home appliance. The power consumption information indicates a value of power consumed by the home appliance within a predetermined period.

The comparison unit 225 compares the power supply information acquired by the first acquisition unit 215 with the power consumption information acquired by the second acquisition unit 220.

The generation unit 230 associates the electrical outlet with the home appliance using the identification information for the electrical outlet and the identification information for the electrical appliance when a concordance rate between the power supply information and the power consumption information exceeds a threshold value according to the result of the comparison by the comparison unit 225. Association information which is information indicating an association between an electrical outlet and a home appliance is generated by the generation unit 230.

The generated association information is sent to and displayed on, for example, the television 102.

When the association information is generated by the generation unit 230, a notification of the completion of home appliance association is sent to the home appliance identified in the association information by the notification unit 240.

The notification unit 240 is a component that is not involved in the process itself of associating a home appliance with an electrical outlet which occurs in the management apparatus 101. Therefore, the notification unit 240 is not an essential component of the management apparatus 101. In other words, even if the management apparatus 101 does not include the notification unit 240, the management apparatus 101 can identify the installation location of each home appliance efficiently and accurately.

Also, the processing done by each component included in the management apparatus 101 shown in FIG. 4 can be realized by, for example, the central processing unit 203 executing a program stored in memory. Additionally, at least one portion of the acquisition function of the second acquisition unit 220 and at least one portion of the notification function of the notification unit 240 are implemented by the wireless module 201*a*.

Also, the generation unit 230 has location-electrical outlet information which indicates an association between a piece of location information such as "living room" with a piece of identification information for the electrical outlet such as an, electrical outlet identification number, for example.

The generation unit 230 can, for example, identify the installation location of a home appliance from the electrical outlet identification number of the outlet associated with the home appliance by referring to the location-electrical outlet information.

FIG. 5 is a table showing the data from the location-electrical outlet information according to the first embodiment of the present invention.

The location information in the location-electrical outlet information shown in FIG. 5 is information identifying the room, such as "living room" or "kitchen". This information can be changed by the system installer or the user at will. Information for all existing electrical outlets is set in advance in each piece of location information and the electrical outlets are identified by identification numbers.

For example, if an electrical outlet with the electrical outlet identification number of "n" is expressed as "electrical outlet n", then the electrical outlet present in the living room (west side) would be shown as electrical outlet "1", and the two electrical outlets present in the living room (east side) would be shown as electrical outlet "2" and electrical outlet "3" in the location-electrical outlet information as displayed in FIG. 5. FIG. 5 also shows the electrical outlets present in the kitchen being electrical outlet "4" and electrical outlet "5".

The electrical outlet 11a shown in FIG. 2 is, for example, electrical outlet 1, the electrical outlet 1ib shown in FIG. 2 is, for example, electrical outlet 9, and the electrical outlet 11c shown in FIG. 2 is, for example, electrical outlet 4.

When a home appliance is associated with an electrical outlet as a result of the comparison of power consumption information of the home appliance and the power supply information of the electrical outlet, the home appliance is associated with the location information from the identification number of the electrical outlet.

For example, when the air conditioner 106 is associated with electrical outlet 1, it can be understood that the air conditioner is installed in the living room (west side) in which the electrical outlet 1 is located.

In this case, the generation unit 230 generates association information indicating an association between a home appliance and an electrical outlet, such as association information indicating that the home appliance identifier of the air conditioner 106 is associated with the information showing "living room (west side)," and outputs it to the television 102. Also, the association information is saved in, for example, a predetermined storage device within the management apparatus 101 (not shown in the figures). Thus the information indicating the installation location of the home appliance is set in the management apparatus 101.

The function of a home appliance network system 100 according to the embodiments of the present invention will be as explained using FIG. 6 through FIG. 12 with a focus on the function of the management apparatus 101 having the configuration described above.

Figure 6:
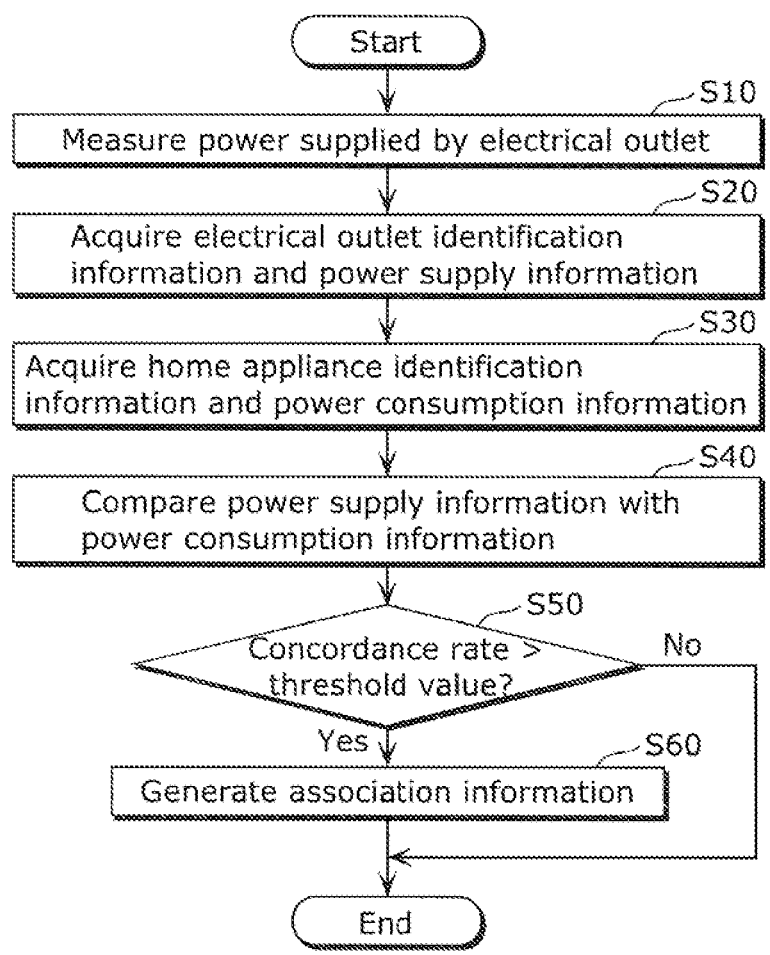
FIG. 6 is a flowchart showing a basic process performed by the management apparatus according to the first embodiment of the present invention.

FIG. 6 is a flow chart showing a basic functional process of the management apparatus 101 according to the first embodiment of the present invention.

The measurement unit 210 measures a value of power supplied from each electrical outlet to home appliances (S10). In other words, the measurement unit 210 measures an amount of power consumed by a home appliance from each electrical outlet.

The first acquisition unit 215 acquires identification information for the electrical outlet and power supply information obtained from the measurement unit 210 (S20). Specifically, the first acquisition unit 215 acquires a value of power supplied and an electrical outlet identification number for each electrical outlet sent from the measurement unit 210.

The second acquisition unit 220 acquires identification information for the home appliance and power consumption information from each home appliance (S30). Additionally, the second acquisition unit 220, for example, acquires information indicating a point in time corresponding to a value of power consumed included in the power consumption information from each home appliance.

The comparison unit 225 compares the power supply information and the power consumption information (S40). Specifically, the comparison unit 225 compares a value of power supplied and a value of power consumed at at least one point in time within a predetermined period, the values obtained from the power consumption information and the power supply information. The comparison unit 225 also compares a variation pattern of power supplied and a variation pattern of power consumed within a predetermined period.

The generation unit 230 associates an electrical outlet with a home appliance when a concordance rate between the power supply information and the power consumption information exceeds a threshold value according to the result of the comparison by the comparison unit 225 (yes in S50). The generation unit 230 generates association information which is information indicating an association between the electrical outlet and the home appliance (S60).

However, the management apparatus 101 ends this processing regarding the electrical outlet when a concordance rate between the power supply information and the power consumption information does not exceed a threshold value (No in S50). The management apparatus 101 will then, for example, compare the power consumption information with the power supply information for a separate electrical outlet.

Next, a specific example of the function of the home appliance network system 100 including the processing done by the management apparatus 101 will be explained using FIG. 7 through FIG. 12.

<Communication Sequence>

An example illustrating the sequence from when the air conditioner 106 is installed in the living room (west side) until the installation location of the air conditioner 106, being the living room (west side), is saved in the management apparatus 101 will be described below.

Here, the air conditioner 106 and the management apparatus 101 are connected wirelessly as previously stated and the management apparatus 101 is capable of acquiring the amount of power the electrical outlet 11a, into which the air conditioner 106 is plugged, supplies.

Figure 7:
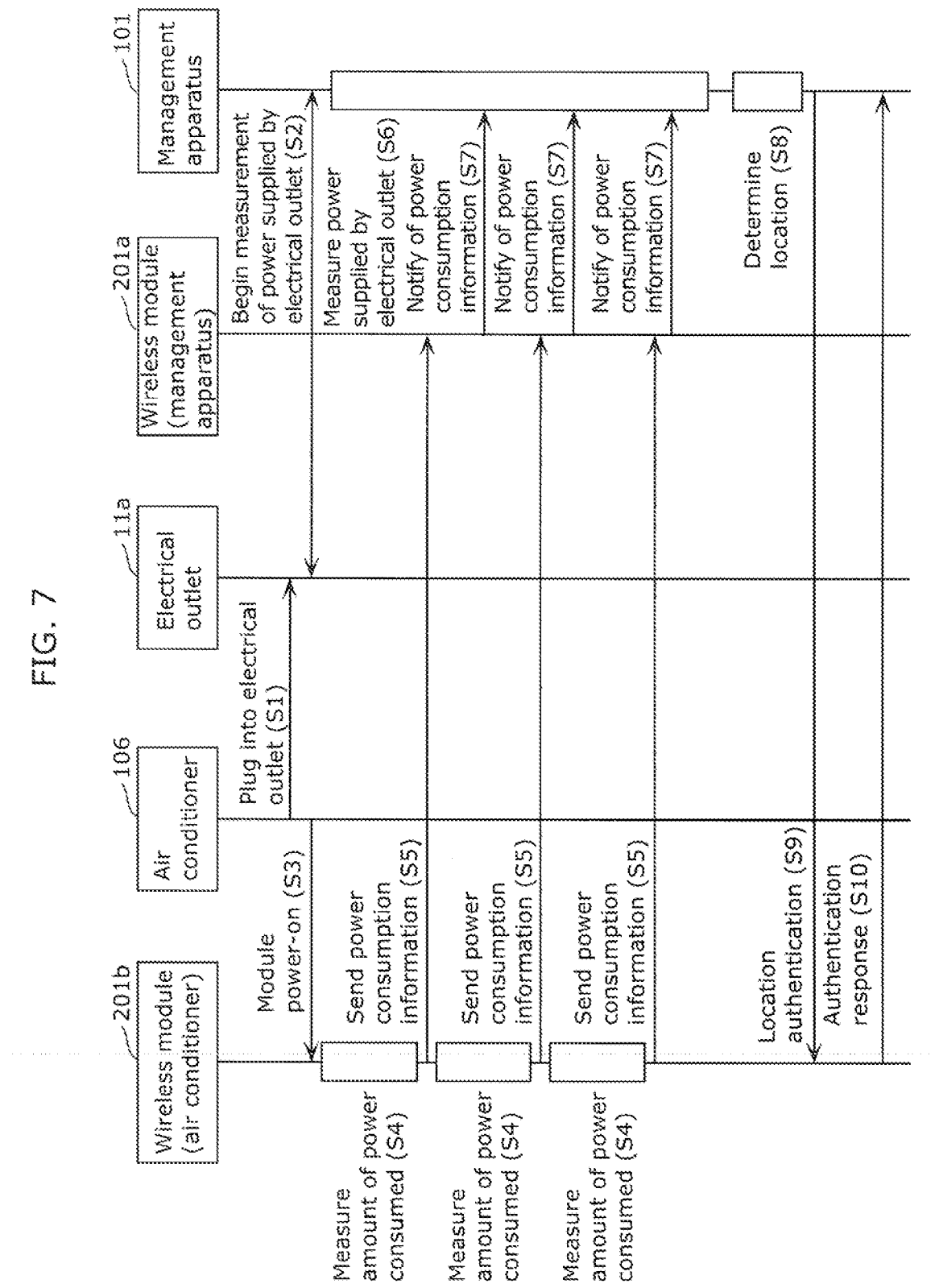
FIG. 7 is a diagram showing an example of the sequence of communication between an air conditioner and the management apparatus when an air conditioner is installed according to the first embodiment of the present invention.

FIG. 7 is a diagram showing an example of the sequence of communication between an air conditioner and the management apparatus when an air conditioner is installed according to the first embodiment of the present invention.

When the user purchases the air conditioner 106 or moves the location of the air conditioner 106 to the living room, the user or installer plugs the air conditioner 106 into the electrical outlet 11a after the installation of the air conditioner 106 has been completed (S1).

The management apparatus 101 monitors the amount of power supplied to each electrical outlet. The management apparatus 101 can detect that power is being supplied to the electrical outlet 11a from the operation of the air conditioner 106. Once this is detected, the management apparatus 101 begins measuring the amount of power supplied to the electrical outlet 11a.

At this time, it is assumed that the installation location and the identification information (in the present embodiment this is an electrical outlet identification number) of the electrical outlet 11a have already been set in the management apparatus 101 by the installer of the electrical outlets or the installer of the management apparatus (see FIG. 5).

Also, turning on the air conditioner 106 activates the microcomputer 202 built into the air conditioner 106. When the microcomputer 202 in the air conditioner 106 is activated, power is supplied to the wireless module 201b in the air conditioner 106 and the wireless module 201b activates (S3).

After the wireless module 201b is activated, it acquires appliance information (the name and identifier of the air conditioner) about the air conditioner 106 from the air conditioner 106 itself and stores it in an internal memory.

The wireless module 201b measures the amount of power consumed by the air conditioner 106 and saves it along with the point in time of measurement as power consumption information (S4).

The power consumption information along with the appliance information stored inside the wireless module 201b are sent to the wireless module 201a belonging to the management apparatus 101 (S5).

It is not necessary for the air conditioner 106 to send the time of measurement of the amount of power consumed to the management apparatus 101. The management apparatus 101 may identify the time of measurement that corresponds with the value of power consumed by the air conditioner 106. For example, the management apparatus 101 may identify a point in time the amount of time t before the time of reception of the power consumption information as the time of measurement of the value of power consumed indicated in the power consumption information, where t is greater than or equal to zero.

Also, the transfer of power consumption information to the wireless module 201b from the wireless module 201a may be done in real time as the amount of power consumed is measured or after the wireless module 201b receives a polling signal from the management apparatus 101.

Also, in FIG. 7, the wireless module 201b sends the power consumption information to the management apparatus 101 with each acquisition of a value of power consumed by the air conditioner 106. However, the wireless module 201b may store a plurality of values of power consumed obtained from a plurality of measurements taken within a predetermined period and send the plurality of values of power consumed to the management apparatus 101 as a single piece of power consumption information.

Alternatively, the wireless module 201b is not required to have a function for measuring the amount of power consumed, as the amount of power consumed may be measured using the power consumption measurement function built into the air conditioner 106, and the wireless module 201b may be notified of the measured value of power consumed by the air conditioner 106.

The wireless module 201a belonging to the management apparatus 101 that has received the power consumption information and the appliance information from the wireless module 201b belonging to the air conditioner 106 notifies the management apparatus 101 of the power consumption information and the appliance information (S7).

Specifically, the wireless module 201a that functions as the second acquisition unit 220 sends the received power consumption information and the received appliance information to the central processing unit 203 that functions as the comparison unit 225.

In the management apparatus 101, the measurement unit 210 measures the amount of power supplied from the electrical outlet 11a and saves the measured supply of power along with the point in time of measurement as power supply information in association with a piece of identification information for the electrical outlet in a predetermined storage device (not shown in the figures) (S6).

Following the communication sequence in which the power consumption information from the air conditioner 106 and the power supply information from the electrical outlet 11a are collected by the management apparatus 101, the management apparatus 101 performs location determination processing to determine the installation location of the air conditioner 106 (S8).

Once the location has been determined, a location authentication packet is sent from the notification unit 240 of the management apparatus 101 to the wireless module 201b of the air conditioner 106 (S9).

The location authentication packet is one example of a piece of information that the management apparatus according to an aspect of the present invention sends to notify a home appliance of the completion of association. In other words, when the association information which indicates that the air conditioner 106 is associated with the electrical outlet 11a is generated by the generation unit 230, the air conditioner 106 is notified of the completion of association.

The wireless module 201b replies with an authentication response (S10) and stops the measurement of power consumed by a home appliance as appropriate.

In other words, by notifying the air conditioner 106 with the information which indicates the completion of association, the management apparatus 101 can stop the measurement of power consumed by the air conditioner 106. This prevents the management apparatus 101 from performing unnecessary processes such as receiving and discarding information such as the power consumption information sent from the air conditioner 106 after the electrical outlet association has been completed for the air conditioner 106. Additionally, the air conditioner 106 is prevented from performing unnecessary processes.

<Home Appliance and Electrical Outlet Association>

The method of associating a home appliance (the air conditioner 106) with an electrical outlet (the electrical outlet 11a) once the power consumption information from the air conditioner 106 and the power supply information from the electrical outlet 11a have been collected in the management apparatus 101 will be shown below.

Figure 8:
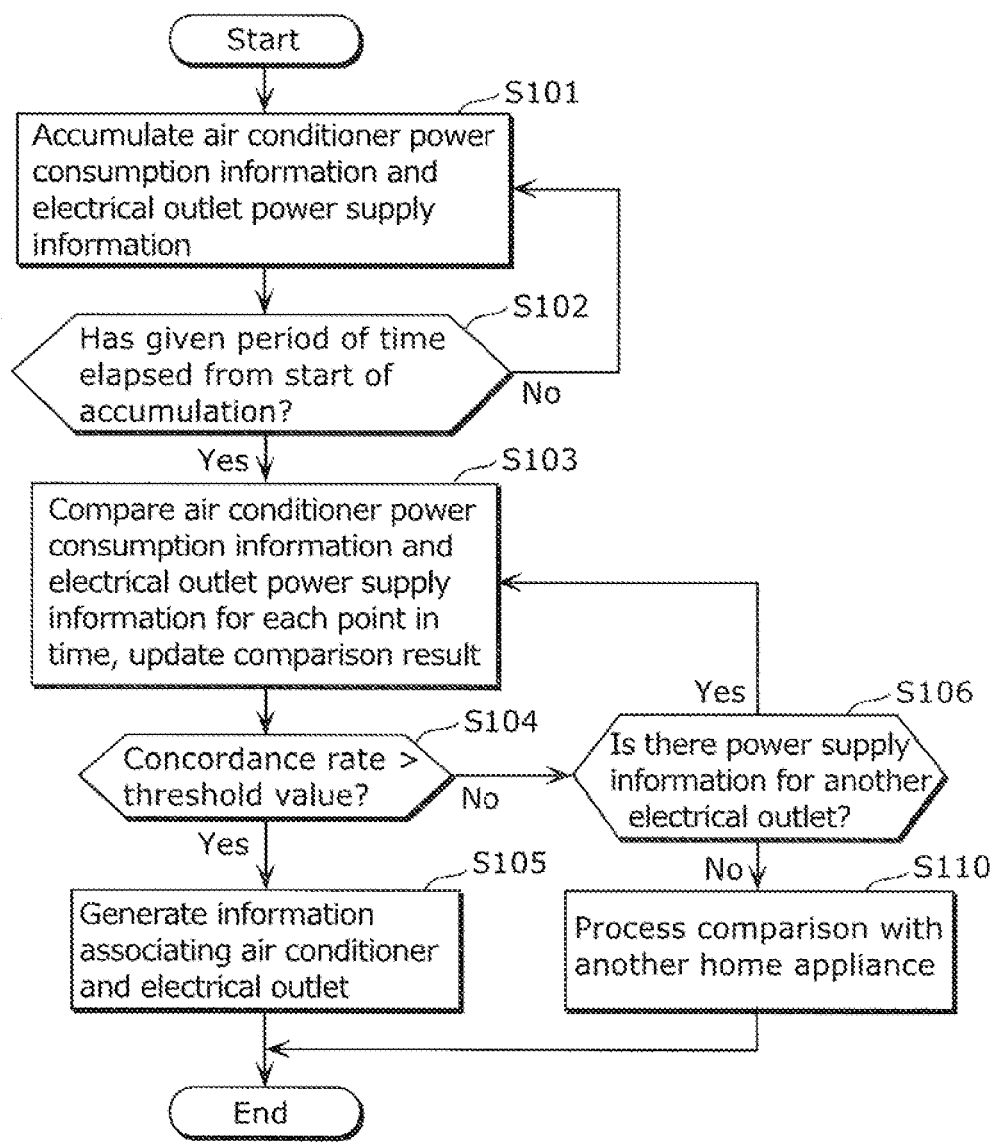
FIG. 8 is a flowchart showing an example of processes relating to the association of an air conditioner and an electrical outlet by the management apparatus according to the first embodiment of the present invention.

FIG. 8 is a flowchart showing an example of the process relating to the association of an air conditioner 106 and an electrical outlet 11a by the management apparatus 101 according to the first embodiment of the present invention.

The management apparatus 101 accumulates power consumption information from the air conditioner 106 and power supply information from the electrical outlet 11a, for example, in the storage area within the comparison unit 225 (S101).

After the management apparatus 101 begins accumulating these pieces of electrical power information, the comparison unit 225 checks to see if a given period of time has elapsed from the start of the accumulation, for example (S102). Consequently, if a given period of time has elapsed (yes in S102), the comparison unit 225 compares the power consumption information and the power supply information from the air conditioner 106 at each point in time electrical power is measured, and updates the result of the comparison. In other words, power consumption information and power supply information are compared at each of one point or more in time.

The power consumption information from the air conditioner 106 and the power supply information from the electrical outlet 11a may be compared at intervals determined by a certain amount of accumulated electrical power information being reached instead of when a given period of time has elapsed. For example, the power consumption information from the air conditioner 106 and the power supply information from the electrical outlet 11a corresponding to the same point in time may also be compared each time both are available.

The comparison unit 225 updates the result of the comparison each time the electrical power is measured. If each result of the comparison done by the comparison unit 225 at each of one point or more in time shows a concordance rate which exceeds a preset threshold value (yes in S104), the generation unit 203 determines that the air conditioner 106 which has sent the power consumption information is connected to the electrical outlet 11a corresponding with the power supply information, and generates association information indicating an association between the air conditioner 106 and the electrical outlet 11a (S105).

If the comparison result of each point in time of measurement yields a concordance rate that does not exceed the threshold value (no in S104), the comparison unit 225 searches to see if power supply information from another electrical outlet exists. If the information does exist (yes in S106), the process returns to step S103 where the power supply information from a different electrical outlet and the power consumption information from the air conditioner 106 are compared. In other words, each of the pieces of power supply information is sequentially compared with the power consumption information.

If no power supply information exists for another electrical outlet (no in S106), then the comparison unit 225 begins the comparing process with another home appliance (S110).

Next, an example of the comparison of the power consumption information for the air conditioner 106 and the power supply information for the electrical outlet 11a will be shown.

Figure 9:
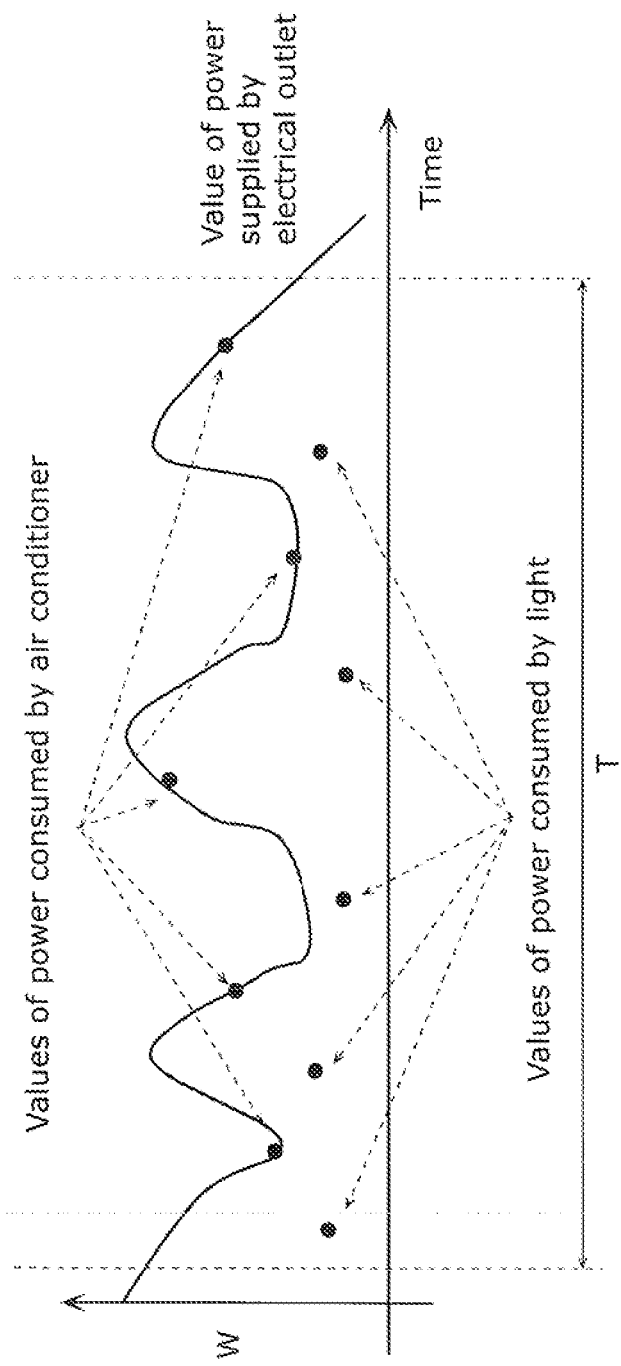
FIG. 9 is a first graph comparing a value of power consumed by an air conditioner and a value of power supplied from an electrical outlet according to the first embodiment of the present invention.

FIG. 9 is the first graph comparing a value of power consumed by the air conditioner 106 and a value of power supplied from the electrical outlet 11a according to the first embodiment of the present invention.

Figure 10:
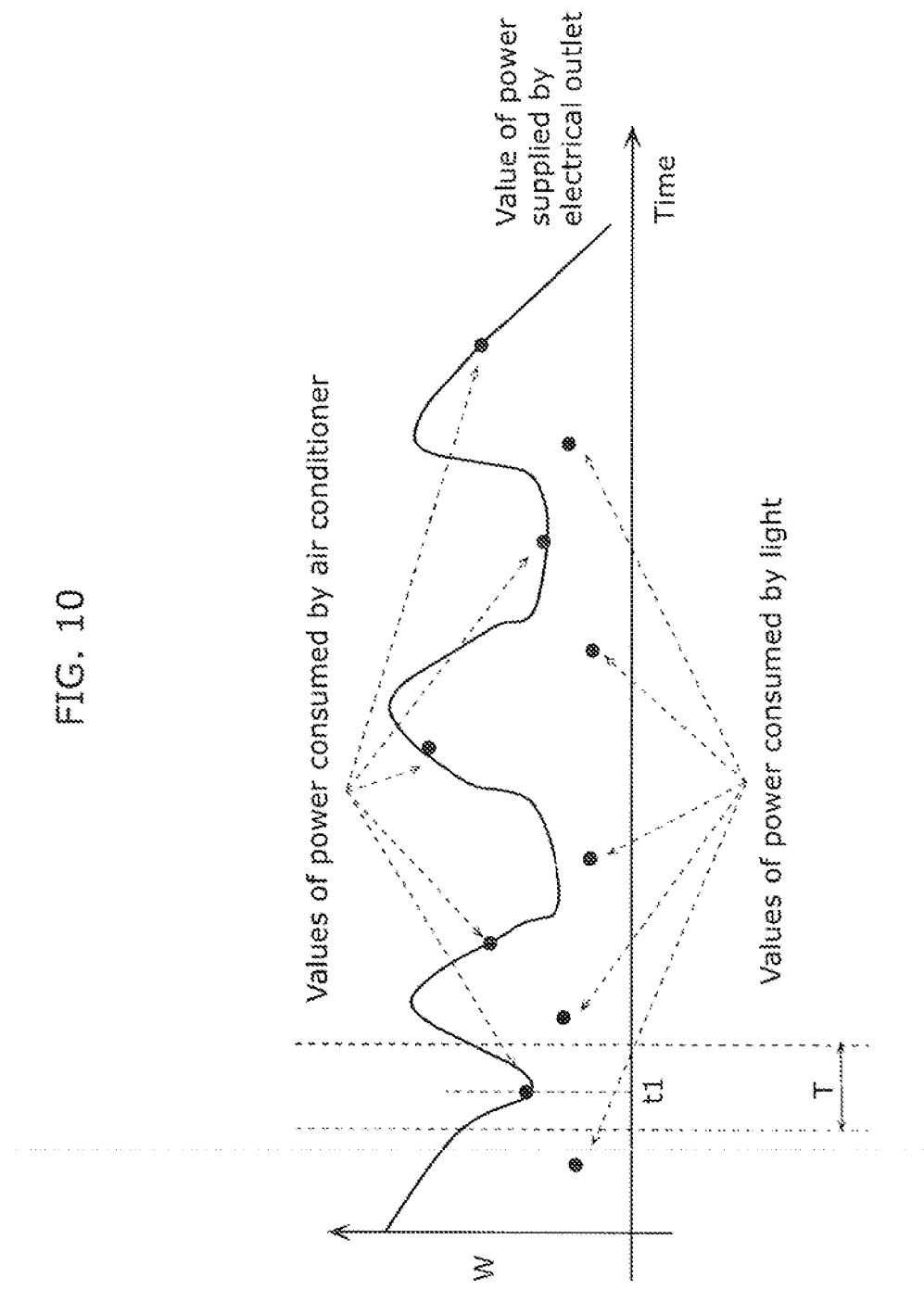
FIG. 10 is a second graph comparing a value of power consumed by an air conditioner and a value of power supplied from an electrical outlet according to the first embodiment of the present invention.

In FIG. 9 and the following FIG. 10, the horizontal axis represents time, and the vertical axis represents power (W). The curved line represents the variation in supply power from the electrical outlet 11a. The plotted points are values of power consumed by the air conditioner 106 and values of power consumed the light 107. Each of the points are correlated with their corresponding home appliance by arrows with dashed lines.

Here, the curved line representing the variation pattern of power supplied from the electrical outlet 11a within a predetermined period T is nearly consistent with the plotted points representing the values of power consumed by the air conditioner 106 within the predetermined period t at each time of measurement. When this is the case, the air conditioner 106 is determined to be connected to the electrical outlet 11a, and a piece of association information indicating an association between the air conditioner 106 and the electrical outlet 11a is generated by the generation unit 230.

Additionally, in FIG. 9, the electrical outlet supplying power to the light 107 is an electrical outlet different from the electrical outlet 11a because the plotted points representing the values of power consumed by the light 107 are not consistent with the curved line representing the value of power supplied from the electrical outlet 11a.

The variation pattern that represents the variation of power supplied from the electrical outlet 11a is an example of the first variation pattern in the management apparatus according to an aspect of the present invention. Also, the variation pattern represented by a series of values of power consumed by the air conditioner 11a at a plurality of points in time is an example of the second variation pattern in the management apparatus according to an aspect of the present invention.

In other words, FIG. 9 shows an example of when a concordance rate between the first variation pattern and the second variation pattern exceeds a threshold value.

The variation pattern of power supplied from the electrical outlet 11a shown in FIG. 9 is displayed as a continuous curved line which is generated from discrete measurement values. Specifically, the curved line is generated, for example, by finding a function that connects the gaps between the measured values. However, the method of generating the curved line is not limited to this specific method.

Also, a variation pattern displayed as a continuous curved line of the power consumed by the air conditioner 106 may be generated of discrete measurement values as well.

In this case, for example, when the difference between the variation pattern of power supplied from the electrical outlet 11a and the variation pattern of power consumed by the air conditioner 106 is within a predetermined range, it can be determined that the concordance rate between the power consumption information and the power supply information exceeds the threshold value.

More specifically, if the function of the difference between the two functions that represent these variation patterns is a function that is variable within a predetermined range from the time axis where W=0 within a predetermined period, it can be determined that the concordance rate between the power consumption information and the power supply information exceeds the threshold value.

Also, for example, a value or values of power supplied and a value or values of power consumed along these two variation patterns for the electrical outlet 11a and the air conditioner 106 may be compared at one or more arbitrary points in time that is within a predetermined period.

In other words, when a value of power supplied and a value of power consumed for a certain point in time are compared for the comparison of the power, consumption information and the power supply information, the value of power supplied and the value of power consumed do not necessarily have to be the actual measured value at that certain point in time.

For example, an estimate value of power supplied from an electrical outlet at the point in time t3 midway between the points in time t1 and t2 can be calculated from the points in time t1 and t2, where t1 and t2 are points in time at which values of power supplied from the electrical outlet were measured. This allows for the comparison of the value of power supplied (estimate value) and the value of power consumed by a home appliance (actual value) at the point in time t3. Similarly, the value of power consumed by a home appliance at the point in time t3 can also be estimated from the values of power consumed by a home appliance measured at the points in time t1 and t2. This allows for the comparison of the value of power supplied (estimate value) and the value of power consumed by a home appliance (estimate value) at the point in time t3.

Also, there are various methods of calculating the concordance rate between the power consumption information and the power supply information within a predetermined period. For example, as shown in FIG. 9, it can be determined that the concordance rate between the power consumption information and the power supply information exceeds the threshold value if every absolute value of the differences between the values of power consumed and the values of power supplied is a predetermined value or lower for each of the points in time within a predetermined period.

Also, for example, it may be determined that the concordance rate between the power consumption information and the power supply information exceeds the threshold value if the ratio between the value of power consumed and the value of power supplied is within a predetermined range for each of the points in time within a predetermined period.

Also, for example, it may be determined that the concordance rate between the power consumption information and the power supply information exceeds the threshold value if the sum of the absolute values of the differences between the value of power consumed and the value of power supplied is a predetermined value or lower for each of the points in time within a predetermined period.

Also, for example, when the value of power consumed and the value of power supplied are compared at the five points in time within the predetermined period such as is shown in FIG. 9, if the ratio between the value of power consumed and the value of power supplied is from 0.95 to 1.05 for three or more of the five points in time, it can be determined that the concordance rate between the power consumption information and the power supply information exceeds the threshold value.

In other words, the generation unit 230 can calculate the concordance rate between the power supply information and the power consumption information using the differences between values of power supplied and values of power consumed at each of a plurality of points in time obtained from the results of the comparison by the comparison unit 225. Also, as previously described, there are various methods of calculating the concordance rate.

Additionally, it may be determined that the concordance rate between the power consumption information and the power supply information exceeds the threshold value when a value of power consumed at a single point in time and a value of power supplied at a single point in time are compared and the difference is within a predetermined range, rather than at a plurality of points in time within a predetermined period.

FIG. 10 is the second graph comparing a value of power consumed by the air conditioner 106 and a value of power supplied from the electrical outlet 11a according to the first embodiment of the present invention.

As shown in FIG. 10, the value of power consumed (actual value or estimate value) at the point in time t1 within the predetermined period T by the air conditioner 106 and the value of power supplied (actual value or estimate value) at the point in time t1 from the electrical outlet 11a are compared by the comparison unit 225. It may be determined that the concordance rate between the power consumption information and the power supply information exceeds the threshold value if the results of the comparison yield an absolute value of the difference between the value of power consumed and the value of power supplied that is a predetermined value or lower.

In other words, it can be determined that the concordance rate between the power consumption information and the power supply information exceeds the threshold value when the difference between the value of power consumed and the value of power supplied at at least one point in time is within a predetermined range.

Whether the concordance rate between the power consumption information and the power supply information exceeds the threshold value or not may be determined by the comparison unit 225 rather than the generation unit 230 as well. In other words, it is acceptable if the generation unit 230 can generate the association information according to the result of the comparison by the comparison unit 225.

The generation unit 230 therefore generates association information according to whether or not the concordance rate between the power consumption information and the power supply information exceeds the threshold value.

FIG. 11A is a table showing an example of association information generated by the generation unit 230 according to the first embodiment of the present invention.

As shown in FIG. 11A, the generation unit 230, for example, generates association information which indicates an association between home appliances with electrical outlets. This association information indicates that a certain home appliance identifier is associated with a certain electrical outlet identification number.

Hence, when only identification information for the home appliance and identification information for the electrical outlet are included in the association information, the electrical outlet identification number can be converted to a location name corresponding to the electrical outlet by, for example, using the location-electrical outlet information shown in FIG. 5.

Likewise, a home appliance identifier can be converted to a home appliance name. For example, a home appliance identifier can be converted to a home appliance name by referring to the appliance information when the appliance information, which includes the home appliance identifier and the home appliance name, is received by the management apparatus 101 and saved in a predetermined storage area (not shown in the figures).

These conversions may be processed by the generation unit 230 when, for example, home appliance names and installation locations are displayed on the television 102. The television 102 saves necessary information such as the location-electrical outlet information, and may also process these conversions by referring to the necessary information.

Also, upon generation of the association information by the generation unit 230, the same unit can also generate association information which indicates a home appliance name and the installation location of the home appliance by processing these conversions.

FIG. 11B is a table showing another example of association information generated by the generation unit 230 according to the first embodiment of the present invention.

As shown in FIG. 11B, the generation unit 230, for example, generates association information associating home appliances with electrical outlets. This association information indicates that a certain home appliance name is associated with a certain electrical outlet location. Hence, the generation unit 230 can also generate association information where the content of the information is expressed as specific home appliance names and specific location names rather than the association of a home appliance and an electrical outlet being expressed as a combination of identification information.

<Example of Use>

A usage example will be described below for the association information when a piece of home appliance information and a piece of location information have been associated.

Figure 12:
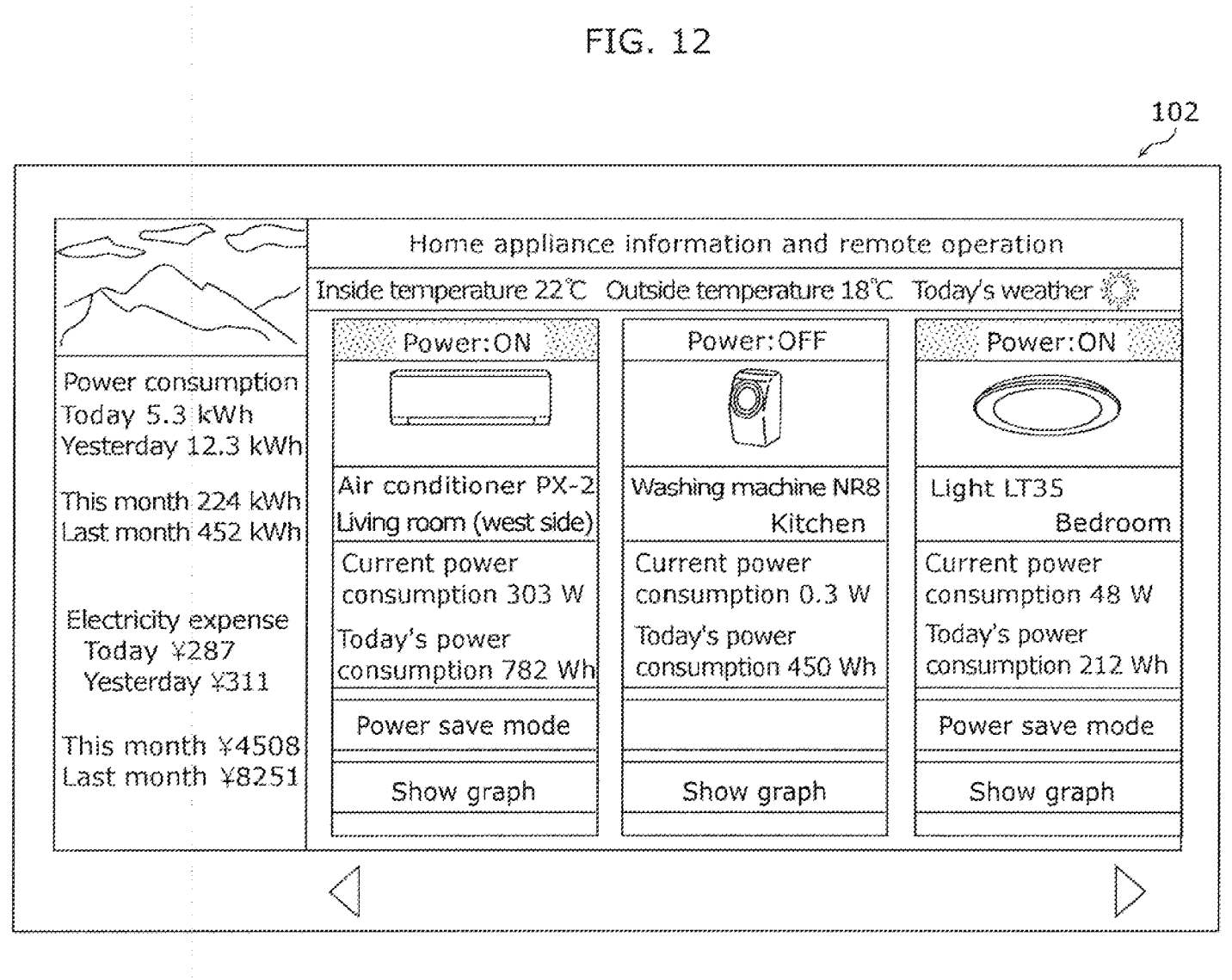

FIG. 12 shows an example of a user interface for displaying power consumption information for home appliances and for remote operation of home appliances according to the first embodiment of the present invention.

FIG. 12 shows an example of a user interface which shows various information and is output from the management apparatus 101 and displayed on the television 102.

Specifically, the names of the air conditioner 106 in the living room, the washing machine 103 in the kitchen, and the light 105 in the bedroom are displayed on the television 102 depicted in FIG. 12.

Information for each home appliance such as information showing whether the appliance is turned on or off, the amount of power consumed for the day, and the room name of the installation location, such as "living room (west side)", "kitchen", and "bedroom" is also displayed.

The previously stated association information generated by the generation unit 230 is used to display at the very least information which indicates the installation location for each of these home appliances.

For example, by realizing that the light 105 (light LT35) has been left on in the bedroom upon viewing the power consumption information for the bedroom on the user interface screen, the user can reduce unnecessary power consumption by selecting and executing the "power off" function on the screen to turn the light 105 off.

[Second Embodiment]

Aside from viewing the power consumption information for home appliances and remote operation of home appliances, the present invention can also be used as a method of home appliance authentication.

Here, the configuration and operation of the management apparatus 101 according to the second embodiment with an emphasis on the process of home appliance authentication will be explained.

When the management apparatus 101 uses a wireless network to connect to home appliances, its range of connectivity is not limited to inside the home of the own user, but is capable of reaching outside the home as well as inside a neighboring home. This can lead to a false authentication, such as when a home appliance is erroneously added to the management apparatus 101 from a different home.

The present invention can prevent false authentication by using the same management method as described in the first embodiment.

Figure 13:
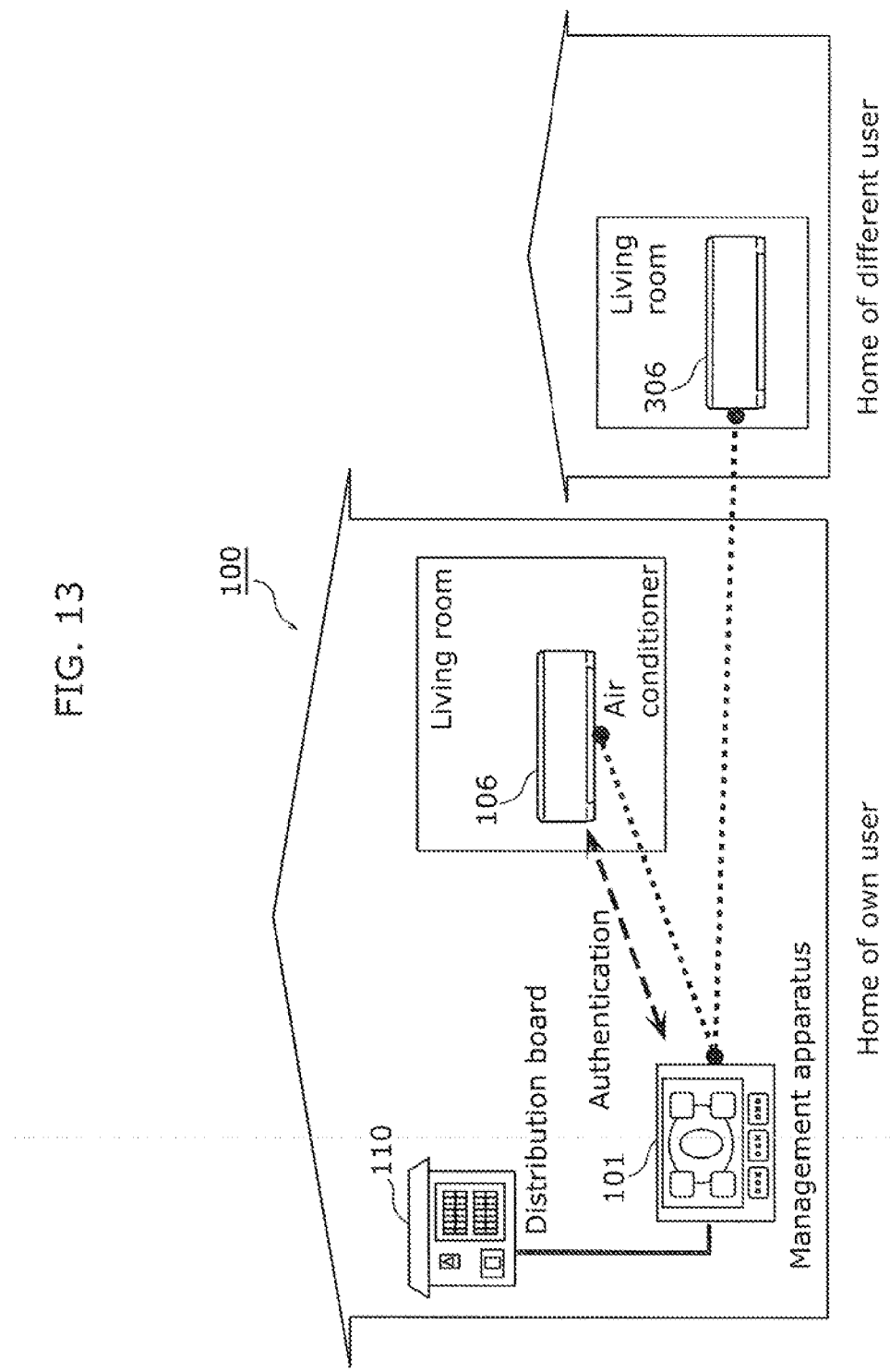
FIG. 13 is a diagram outlining the relation of a home appliance network system in the home of the own user, and an air conditioner installed in a home of a different user according to the second embodiment of the present invention.

FIG. 13 is a diagram outlining the relation of a home appliance network system 100 in the home of the own user, and an air conditioner installed in a home of a different user according to the second embodiment of the present invention. The explanations of the components in FIG. 13 that are the same as in FIG. 1 and use the same reference signs will be omitted.

FIG. 13 shows the home of the own user with the air conditioner 106 in the living room, and a home of a different user with an air conditioner 306 in the living room. Here it is to be assumed that the setup operation for the air conditioners starting.

When the management method described in the first embodiment is used in the home of the own user, the management apparatus 101 can associate the air conditioner 106 with the electrical outlet that the air conditioner 106 is plugged into with absolute certainty by comparing the power consumption information from the air conditioner 106 with the power supply information from the electrical outlet, as previously stated. In other words, the management apparatus 101 can certify that the air conditioner 106 is a home appliance that is installed in the home of the own user.

The air conditioner 306 in the living room of a home of a different user can send via wireless communication information such as its identifier and power consumption information to the management apparatus 101 in the home of the own user. However, when the management apparatus 101 searches the power supply information for the electrical outlets in the home of the own user, it will find that the power consumption information from the air conditioner 306 does not correspond to any of the power supply information for the electrical outlets.

As a result, the management apparatus 101 can certify that the air conditioner 306 is a home appliance that is not installed in the home of the own user, but a home appliance installed outside the home, thereby preventing false certification.

Information regarding home appliances that are certified to be installed outside the home of the own user (hereinafter referred to as "outside appliances") may be saved in the exclusion list. Thus, the management apparatus 101 can avoid unnecessarily comparing the identifier and the power consumption information from outside appliances when subsequently received by the management apparatus 101.

Figure 14:
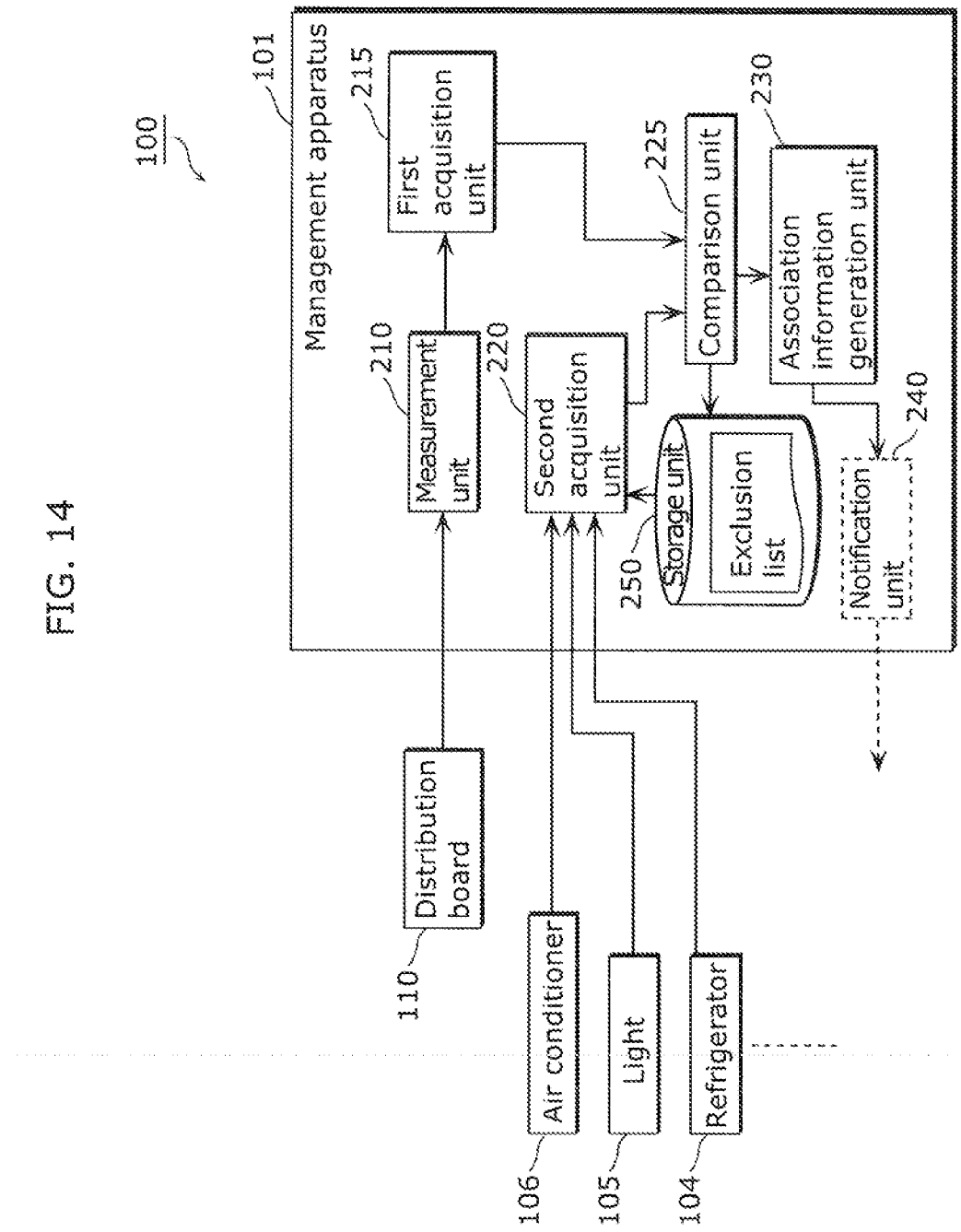
FIG. 14 is a block diagram showing a basic functional configuration of the management apparatus that includes a storage unit which stores an exclusion list according to the second embodiment of the present invention.
Figure 17:
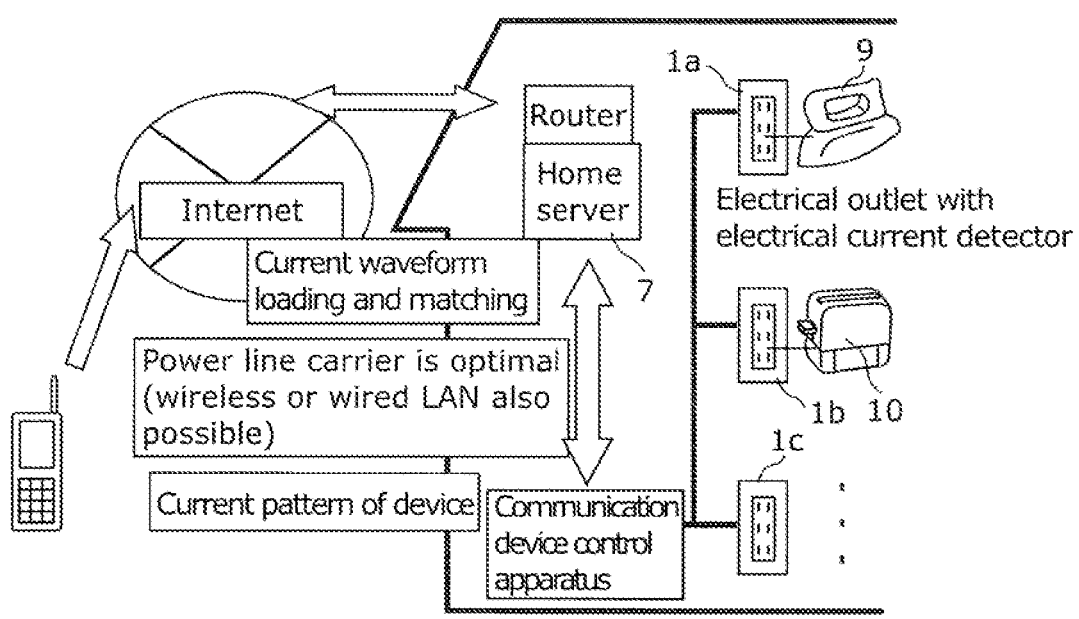
FIG. 17 is a diagram showing a conventional home appliance management method.

FIG. 14 is a block diagram showing a basic functional configuration of the management apparatus 101 that includes a storage unit which stores an exclusion list according to the second embodiment of the present invention.

The explanations of the components in FIG. 14 that are the same as in FIG. 4 and use the same reference signs will be omitted.

The exclusion list, which is saved in the storage unit 250 of the management apparatus 101 according to the second embodiment, is, for example, created and updated by the comparison unit 225 and referred to by the second acquisition unit 220.

FIG. 15 is a flowchart showing an example of a process involving home appliance authentication performed by the management apparatus 101 according to the second embodiment of the present invention.

Specifically, FIG. 15 is the same as FIG. 8 with the processes S90, S100, and S108 added. Therefore, the following explanation will focus on these added processes, omitting the other processes.

Here, using the flowchart depicted in FIG. 15, we will assume that the concordance rate between the power supply information for an electrical outlet and the power consumption information for a home appliance for which an installation location is determined (for example an air conditioner) that does not exceed the threshold rate (no in S104), as well as that no other power supply information for a different electrical outlet exists (no is S106).

In this case, the electrical outlet that the air conditioner is plugged into does not exist within the management realm of the management apparatus 101. In other words, the air conditioner is not installed in the home of the own user. Thus, the air conditioner is determined to be an outside appliance. In this case, the comparison unit 225 for example, adds information identifying the air conditioner to the exclusion list (S108).

FIG. 16 is a graph showing an example of exclusion list data saved by the management apparatus 101 according to the second embodiment of the present invention.

In the example shown in FIG. 16, a home appliance identifier and the home appliance name are saved to the exclusion list. Information identifying an outside appliance may be saved to the exclusion list, as well as just one or the other of a home appliance identifier or a home appliance name.

When such an exclusion list is saved in the management apparatus 101, the second acquisition unit 220 refers to the exclusion list when it acquires, for example, the power consumption information and the home appliance identifier for an air conditioner (S90).

Specifically, the second acquisition unit 220 confirms whether the acquired home appliance identifier is saved in the exclusion list or not (S100). As a result, if the home appliance identifier is saved in the exclusion list (yes in S100) the second acquisition unit 220 discards the received power consumption information without sending it to the comparison unit 225. In other words, the comparison of the power consumption information is not processed.

Also, if the home appliance identifier is not saved in the exclusion list (no in S100) as a result of the confirmation, processes after step S101 for determining the installation location of the home appliance occur as explained in FIG. 8.

The comparison unit 225 instead of the second acquisition unit 220 may determine whether or not the home appliance in question is an outside appliance by referring to the exclusion list.

Also, if a home appliance having the same identification information as an outside appliance saved in the exclusion list is installed in the home of the own user, the identification information may be deleted from the exclusion list and set so that it is not saved to the exclusion list again.

In this case, the comparison regarding the power consumption information sent from the outside -appliance is processed by the management apparatus 101. However, as previously stated, the management apparatus 101 will not erroneously authenticate the home appliance as an appliance in the home of the own user as it will compare the power consumption information with the power supply information for the electrical outlets in the home of the own user.

Hence, the power consumption information for a home appliance and the power supply information for an electrical outlet within a predetermined period are compared by the management apparatus 101 according to both the first embodiment and the second embodiment of the present invention. When the concordance rate exceeds a threshold value according to the result of the comparison, the management apparatus 101 generates association information which is information indicating an association between an electrical outlet and a home appliance.

In other words, the management apparatus 101 can identify the installation location of each home appliance efficiently and accurately by comparing the electrical power measured at the electrical outlet with the electrical power measured at the home appliance.

This concludes the explanations based on the management apparatus and management method according to the first embodiment and the second embodiment of the present invention. However, the present invention is not limited to these embodiments. Various modifications of the exemplary embodiment as well as embodiments resulting from arbitrary combinations of a plurality of constituent elements previously described that may be conceived by those skilled in the art are intended to be included within the scope of the present invention as long as these do not depart from the essence of the present invention.

For example, one part of or the whole functional configuration of the management apparatus 101 shown in both FIG. 4 and FIG. 14 can be realized as one or more integrated circuits. In other words, the management apparatus 101 can be realized as one or more integrated circuits.

Also, for example, when there is a plurality of pieces of power supply information with which the concordance rate between the power consumption information exceeds a threshold value as determined by the comparison of each piece of power supply information for a plurality of electrical outlets and the power consumption information for a home appliance, the management apparatus 101 may select the power supply information with the highest concordance rate.

In other words, if there is plurality of electrical outlets that the home appliance in question may possibly be plugged into, the electrical outlet with the highest concordance rate among them may be selected. This increases the reliability of the association of a home appliance with an electrical outlet.

Also, while home appliances were used as examples of electrical appliances in the explanations for each of the previously stated embodiments, electrical appliances are not limited to these examples. Other applicable examples of electrical appliances according to the present invention include a battery or an electric automobile, for example.

The management apparatus and management method for electrical appliances according to the present invention does not require the user to perform complicated operations and is useful as a management apparatus and management method for electrical appliances which can save the installation location of an electrical appliance in the management apparatus when a network system connecting the management apparatus with electrical appliances over a wireless network is established.

Also, the present invention can be used for electrical appliance authentication as a means to prevent electrical appliances from a different home and the management apparatus in the home of the user from erroneously connecting.

REFERENCE SIGNS LIST 11a, 11b, 11c electrical outlet
100 home appliance network system
101 management apparatus
102 television
103 washing machine
104 refrigerator
105, 107 light
106 air conditioner
108 solar panel
109 power conditioner
110 distribution board
201a, 201b wireless module
202 microcomputer
203 central processing unit
210 measurement unit
215 first acquisition unit
220 second acquisition unit
225 comparison unit
230 generation unit
240 notification unit
250 storage unit
306 air conditioner in a home of a different user

The invention claimed is:

1. A management apparatus comprising:
a wireless module configured to communicate wirelessly with an electrical appliance and distribution board connected over a network;
a non-transitory computer-readable recording medium storing a program; and
a hardware processor that executes the program and causes the management apparatus to operate as:
a measurement unit configured to measure a value of power supplied from an electrical outlet to the electrical appliance as measured at the distribution board during a predetermined period;
a first acquisition unit configured to acquire identification information for the electrical outlet and power supply information for the outlet from the distribution board, the identification information for the electrical outlet identifying the location of the outlet and the power supply information being a value of power supplied by the outlet to the appliance as measured at the distribution board during the predetermined period;
a second acquisition unit configured to acquire from the electrical appliance identification information for the electrical appliance and power consumption information, the electrical appliance information identifying the type of appliance and the power consumption information indicating a value of power consumed by the electrical appliance during the predetermined period, the value of power consumed being output by the electrical appliance and measured by a measurement device in the electrical appliance, and determined concurrently with the power measured from the electrical outlet during the predetermined period;

a comparison unit configured to compare the acquired power supply information for the outlet with the acquired power consumption information for the electrical appliance for determining a concordance rate between the power supply information and the power consumption information, the concordance rate being determined by comparing the value of the power supplied by the outlet to the appliance and the value of the power consumed by the electrical appliance at a point in time during the predetermined time period;

a generation unit configured to generate information indicating an association between the electrical appliance and the electrical outlet using the identification information for the electrical outlet and the identification information for the electrical appliance when the concordance rate between the power supply information and the power consumption information exceeds a threshold value according to a result of the comparison; and a storage unit configured to store the association information between the electrical appliance and the electrical outlet, the association information indicating an installation location of the electrical appliance in the electrical outlet during the predetermined period, wherein the wireless module outputs the association information between the electrical appliance and the electrical outlet to an external display device that displays the association information between the electrical appliance and the electrical outlet.

2. The management apparatus according to claim 1, wherein the comparison unit is configured to compare the value of power supplied at least at one point in time within the predetermined period with the value of power consumed at the at least one point in time within the predetermined period, the value of power supplied being obtained from the power supply information, and the value of power consumed being obtained from the power consumption information, and the generation unit is configured to determine that the concordance rate between the power supply information and the power consumption information exceeds the threshold value when a difference between the value of power supplied and the value of power consumed is within a predetermined range according to the result of the comparison.

3. The management apparatus according to claim 2, wherein the comparison unit is configured to compare values of power supplied at points in time within the predetermined period including the one point in time, with values of power consumed at the respective points in time within the predetermined period including the one point in time, the values of power supplied being obtained from the power supply information, and the values of power consumed being obtained from the power consumption information, and the generation unit is configured to calculate the concordance rate between the power supply information and the power consumption information using differences between the values of power supplied and the values of power consumed at the respective points in time obtained from the results of the comparison.

4. The management apparatus according to claim 1, wherein the first acquisition unit is configured to acquire the power supply information indicating the value of power supplied at respective points in time within the predetermined period, the second acquisition unit is configured to acquire the power consumption information indicating the value of power consumed the respective points in time within the predetermined period, the comparison unit is configured to compare a first variation pattern with a second variation pattern, the first variation pattern being obtained from the power supply information and indicating a change in the power supplied within the predetermined period, and the second variation pattern being obtained from the power consumption information and indicating a change in the power consumed within the predetermined period, and the generation unit is configured to determine that the concordance rate between the power supply information and the power consumption information exceeds the threshold value when the difference between a first variation pattern and the second variation pattern is within a predetermined range according to the result of the comparison.

5. The management apparatus according to claim 1, wherein the measurement unit is configured to measure a value of power supplied from a plurality of the electrical outlets, including the electrical outlet, the first acquisition unit is configured to acquire pieces of identification information for each of the electrical outlets and pieces of power supply information which indicates a value of power supplied within a predetermined period for each of the electrical outlets, the comparison unit is configured to compare each piece of the power supply information acquired with the power consumption information acquired, and the generation unit is configured to generate information indicating an association between the electrical appliance and the electrical outlet which corresponds to the piece of the power supply information indicating that the concordance rate with the power consumption information exceeds the threshold value according to the result of the comparison.

6. The management apparatus according to claim 5, wherein the generation unit is configured to identify a piece of the power supply information with a highest concordance rate and generates information indicating an association between the electrical outlet corresponding to the identified power supply information and the electrical appliance among two or more pieces of the power supply information indicating a value exceeding the threshold value of the concordance rate between the power supply information and the power consumption information.

7. The management apparatus according to claim 1 wherein the hardware processor executes the program and causes the management apparatus to further operate as:

a notification unit configured to send out a notification of the completion of association to the electrical appliance when the association information is generated.

8. The management apparatus according to claim 1 further comprising:

a memory that stores an exclusion list, wherein (a) the comparison unit is configured to add the identification information for the electronic appliance to the exclusion list when the concordance rate between the power supply information and the power consumption information is equal to or smaller than the threshold value, and when power consumption information and identification information for the electrical appliance are acquired by the second acquisition unit from the electrical appliance or a different electrical appliance, (b-i) the comparison unit skips comparing the power supply information with the power consumption information when the identification information for the electrical appliance is stored in the exclusion list, and (b-ii) the comparison unit compares the power supply information with the power consumption information when the identification information for the electrical appliance is not stored in the exclusion list.

9. A management method executed on a management apparatus, the management apparatus including a hardware processor that executes the program and causes the management apparatus to perform the management method for an electrical appliance, the management method comprising:
communicating wirelessly, using a wireless module, with an electrical appliance and distribution board connected over a network;
measuring, using a measurement unit, a value of power supplied from an electrical outlet to the electrical appliance as measured at the distribution board during a predetermined period;
acquiring, using a first acquisition unit, identification information for the electrical outlet and power supply information for the outlet from the distribution board, the identification information for the electrical outlet identifying the location of the outlet and the power supply information being a value of power supplied by the outlet to the appliance as measured at the distribution board during the predetermined period;
acquiring, using a second acquisition unit, from the electrical appliance identification information for the electrical appliance and power consumption information, the electrical appliance information identifying the type of appliance and the power consumption information indicating a value of power consumed by the electrical appliance during the predetermined period, the value of power consumed being output by the electrical appliance and measured by a measurement device in the electrical appliance, and determined concurrently with the power measured from the electrical outlet during the predetermined period;
comparing, using a comparison unit, the acquired power supply information from the outlet with the acquired power consumption information for the electrical appliance for determining a concordance rate between the power supply information and the power consumption information, the concordance rate being determined by comparing the value of the power supplied by the outlet to the appliance and the value of the power consumed by the electrical appliance at a point in time during the predetermined time period;
generating, using a generation unit, information indicating an association between the electrical appliance and the electrical outlet using the identification information for the electrical outlet and the identification information for the electrical appliance when the concordance rate between the power supply information and the power consumption information exceeds a threshold value according to the comparing; and
storing, using a storage unit, the association information between the electrical appliance and the electrical outlet, the association information indicating an installation location of the electrical appliance in the electrical outlet during the predetermined period,
wherein the wireless module outputs the association information between the electrical appliance and the electrical outlet to an external display device that displays the association information between the electrical appliance and the electrical outlet.

10. A non-transitory computer-readable recording medium for a management apparatus storing a program for electrical appliance management, the program causing a management apparatus to execute steps comprising:
communicating wirelessly, using a wireless module, with an electrical appliance and distribution board connected over a network;
measuring, using a measurement unit, a value of power supplied from an electrical outlet to the electrical appliance as measured at the distribution board during a predetermined period;
acquiring, using a first acquisition unit, identification information for the electrical outlet and power supply information for the outlet from the distribution board, the identification information for the electrical outlet identifying the location of the outlet and the power supply information being a value of power supplied by the outlet to the appliance as measured at the distribution board during the predetermined period;
acquiring, using a second acquisition unit, from the electrical appliance identification information for the electrical appliance and power consumption information, the electrical appliance information identifying the type of appliance and the power consumption information indicating a value of power consumed by the electrical appliance during the predetermined period, the value of power consumed being output by the electrical appliance and measured by a measurement device in the electrical appliance, and determined concurrently with the power measured from the electrical outlet during the predetermined period;
comparing, using a comparison unit, the acquired power supply information from the outlet with the acquired power consumption information for the electrical appliance for determining a concordance rate between the power supply information and the power consumption information, the concordance rate being determined by comparing the value of the power supplied by the outlet to the appliance and the value of the power consumed by the electrical appliance at a point in time during the predetermined time period;
generating, using a generation unit, information indicating an association between the electrical appliance and the electrical outlet using the identification information for the electrical outlet and the identification information for the electrical appliance when the concordance rate between the power supply information and the power consumption information exceeds a threshold value according to the comparing; and
storing, using a storage unit, the association information between the electrical appliance and the electrical outlet, the association information indicating an installation location of the electrical appliance in the electrical outlet during the predetermined period,
wherein the wireless module outputs the association information between the electrical appliance and the electrical outlet to an external display device that displays the association information between the electrical appliance and the electrical outlet.

11. An integrated circuit for a management apparatus comprising:
a communication circuit that communicates wirelessly with an electrical appliance and a distribution board connected over a network;

a measurement circuit that measures a value of power supplied from an electrical outlet as measured at the distribution board during a predetermined period;

a first acquisition circuit that acquires identification information for the electrical outlet and power supply information for the outlet from the distribution board, the identification information for the electrical outlet identifying the location of the outlet and the power supply information being a value of power supplied by the outlet to the appliance as measured at the distribution board during the predetermined period;

a second acquisition circuit that acquires from the electrical appliance, via the communication circuit, identification information for the electrical appliance and power consumption information, the electrical appliance information identifying the type of appliance and the power consumption information indicating a value of power consumed by the electrical appliance during the predetermined period, the value of power consumed being output by the electrical appliance and measured by a measurement device in the electrical appliance, and determined concurrently with the power measured from the electrical outlet during the predetermined period;

a comparison circuit that compares the power supply information for the outlet acquired by the first acquisition circuit with the power consumption information acquired by the second acquisition circuit for the electrical appliance for determining a concordance rate between the power supply information and the power consumption information, the concordance rate being determined by comparing the value of the power supplied by the outlet to the appliance and the value of the power consumed by the electrical appliance at a point in time during the predetermined time period;

a generation circuit that generates information indicating an association between the electrical appliance and the electrical outlet using the identification information for the electrical outlet and the identification information for the electrical appliance when the concordance rate between the power supply information and the power consumption information exceeds a threshold value according to a result of the comparison by the comparison circuit, wherein the generation circuit stores the association information between the electrical appliance and the electrical outlet, the association information indicating an installation location of the electrical appliance in the electrical outlet during the predetermined period, and the communication circuit outputs the association information between the electrical appliance and the electrical outlet to an external display device that displays the association information between the electrical appliance and the electrical outlet.

12. A electrical appliance network system comprising:
the management apparatus according to claim 1; and the electrical appliance,
wherein the electrical appliance includes a power consumption output unit that outputs the value of power consumed by the electrical appliance within the predetermined period.

* * * * *